United States Patent
Yang et al.

(10) Patent No.: US 11,963,136 B2
(45) Date of Patent: Apr. 16, 2024

(54) GRADUAL SENSING FOR USER EQUIPMENT POWER SAVING IN SIDELINK OPERATION

(71) Applicant: QUALCOMM Incorporated, San Diego, CA (US)

(72) Inventors: Wei Yang, San Diego, CA (US); Seyedkianoush Hosseini, San Diego, CA (US); Wanshi Chen, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 245 days.

(21) Appl. No.: 17/148,876

(22) Filed: Jan. 14, 2021

(65) Prior Publication Data

US 2022/0225280 A1    Jul. 14, 2022

(51) Int. Cl.
*H04W 72/02* (2009.01)
*H04W 72/0446* (2023.01)
(Continued)

(52) U.S. Cl.
CPC ....... *H04W 72/02* (2013.01); *H04W 72/0446* (2013.01); *H04W 72/0453* (2013.01); *H04W 76/28* (2018.02); *H04W 92/18* (2013.01)

(58) Field of Classification Search
CPC . H04W 72/02; H04W 76/28; H04W 72/0446; H04W 72/0453; H04W 92/18
See application file for complete search history.

(56) References Cited

U.S. PATENT DOCUMENTS

2018/0234153 A1\*   8/2018   Lincoln ............. H04W 52/0274
2019/0222983 A1\*   7/2019   Adachi ................. H04W 92/18
(Continued)

FOREIGN PATENT DOCUMENTS

WO   WO-2018145067 A1   8/2018
WO   WO-2020068253 A2   4/2020

OTHER PUBLICATIONS

Huawei., et al., "Physical Layer Impacts of Sidelink DRX", 3GPP Draft, R1-2008332, 3GPP TSG RAN WG1 #103-e, 3rd Generation Partnership Project (3GPP), Mobile Competence Centre, 650, Route Des Lucioles, F-06921 Sophia-Antipolis Cedex, France, vol. RAN WG1, No. E-meeting, Oct. 26, 2020-Nov. 13, 2020, Oct. 24, 2020 (Oct. 24, 2020), XP051946632, 6 Pages, Retrieved from the Internet: URL:https://ftp.3gpp.org/tsg_ran/WG1_RL1/TSGR1_103-e/Docs/R1-2008332.zip R1-2008332.docx [retrieved on Oct. 24, 2020] 3, Section 3.1.

(Continued)

*Primary Examiner* — Kent Krueger
(74) *Attorney, Agent, or Firm* — Arun Swain

(57) ABSTRACT

Methods, systems, and devices for wireless communication are described. In some cases, a sidelink user equipment (UE) operating in a power saving mode may identify a resource reservation configuration for communicating within a resource pool allocated for sidelink communications. The UE may operate in a first power state of the power saving mode during a sensing window. The sensing window may correspond to a resource selection window of the resource pool. The UE may transition, after the sensing window, from the first power state to a second power state that may consume more power than the first power state. The UE may identify a subset of resources of the resource pool in the resource selection window that are available for sidelink (Continued)

transmission by the UE based on transitioning between the first power state and the second power state.

30 Claims, 16 Drawing Sheets

(51) Int. Cl.
*H04W 72/0453* (2023.01)
*H04W 76/28* (2018.01)
*H04W 92/18* (2009.01)

(56) References Cited

U.S. PATENT DOCUMENTS

| | | | |
|---|---|---|---|
| 2020/0229171 A1 | 7/2020 | Khoryaev et al. | |
| 2020/0344722 A1 | 10/2020 | He et al. | |
| 2021/0227604 A1* | 7/2021 | Huang | H04W 72/02 |
| 2021/0351877 A1* | 11/2021 | Xu | H04W 72/0446 |
| 2023/0084593 A1* | 3/2023 | Hoang | H04W 72/02 |

OTHER PUBLICATIONS

International Search Report and Written Opinion—PCT/US2021/063510—ISA/EPO—Apr. 7, 2022.

\* cited by examiner

GRADUAL SENSING FOR USER EQUIPMENT POWER SAVING IN SIDELINK OPERATION

FIELD OF TECHNOLOGY

The following relates to wireless communication, including gradual sensing for user equipment (UE) power saving in sidelink operation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A sidelink UE may communicate with one or more other UEs via resources selected from a sidelink resource pool. A UE may operate in a power saving mode and may not monitor resources in the sidelink resource pool while operating in a low power state of the power saving mode. The UE may be unable to transmit sidelink data in corresponding resources in the sidelink resource pool that the UE did not monitor, which may increase latency associated with sidelink communications by the UE during power saving operations.

SUMMARY

The described techniques relate to improved methods, systems, devices, and apparatuses that support gradual sensing for user equipment (UE) power saving in sidelink operation. Generally, the described techniques provide for a sidelink UE to transmit sidelink messages in resources that were not monitored by the UE due to the UE operating in a power saving mode (e.g., a low power state during a power saving mode). The UE may identify a resource reservation configuration for communicating within a resource pool (e.g., a set of time and frequency resources) allocated for sidelink communication. In some examples, the UE may operate in a low power state during a sensing window, where the UE may refrain from monitoring the resource pool (e.g., performing channel sensing) during the sensing window due to operating in the low power state. The sensing window may be a set of time and frequency resources of the resource pool that the UE monitors for determining availability of one or more resources in an upcoming resource selection window. In some examples, the UE may receive a resource selection trigger that may indicate the UE has sidelink data to communicate, causing the UE to transition from the low power state to a high power state. The resource reservation configuration may permit the UE to select a first resource in the resource selection window for sidelink transmission even though the UE did not monitor a corresponding resource in the sensing window to determine that the first resource is available for sidelink transmission. The UE may transmit a sidelink message in the first resource, which may permit the UE to operate in the low power state during the sensing window without incurring significant latency in selecting a resource in the resource selection window for sidelink transmission.

A method for wireless communication at a UE is described. The method may include identifying a resource reservation configuration for communicating within a resource pool allocated for sidelink communications, transitioning from a first power state to a second power state that consumes more power than the first power state after a first sensing window occurs, the first sensing window corresponding to a first resource selection window of the resource pool of the resource reservation configuration, and determining that a first subset of resources of the resource pool in the first resource selection window are available for sidelink data transmission based on the transitioning from the first power state to the second power state.

An apparatus for wireless communication at a UE is described. The apparatus may include a processor, memory in electronic communication with the processor, and instructions stored in the memory. The instructions may be executable by the processor to cause the apparatus to identify a resource reservation configuration for communicating within a resource pool allocated for sidelink communications, transition from a first power state to a second power state that consumes more power than the first power state after a first sensing window occurs, the first sensing window corresponding to a first resource selection window of the resource pool of the resource reservation configuration, and determine that a first subset of resources of the resource pool in the first resource selection window are available for sidelink data transmission based on the transitioning from the first power state to the second power state.

Another apparatus for wireless communication at a UE is described. The apparatus may include means for identifying a resource reservation configuration for communicating within a resource pool allocated for sidelink communications, means for transitioning from a first power state to a second power state that consumes more power than the first power state after a first sensing window occurs, the first sensing window corresponding to a first resource selection window of the resource pool of the resource reservation configuration, and means for determining that a first subset of resources of the resource pool in the first resource selection window are available for sidelink data transmission based on the transitioning from the first power state to the second power state.

A non-transitory computer-readable medium storing code for wireless communication at a UE is described. The code may include instructions executable by a processor to identify a resource reservation configuration for communicating within a resource pool allocated for sidelink communications, transition from a first power state to a second power state that consumes more power than the first power state after a first sensing window occurs, the first sensing window corresponding to a first resource selection window of the resource pool of the resource reservation configuration, and determine that a first subset of resources of the resource pool in the first resource selection window are available for sidelink data transmission based on the transitioning from the first power state to the second power state.

Some examples of the method, apparatuses, and non-transitory computer-readable medium described herein may further include operations, features, means, or instructions for selecting a resource from the first subset of resources and transmitting a sidelink data message within the resource.

Some examples of the method, apparatuses, and non-transitory computer-readable medium described herein may further include operations, features, means, or instructions for determining that the first subset of resources of the first resource selection window may be available for sidelink data transmission based on the UE operating in the first power state during a sensing resource in the first sensing window that corresponds to the first subset of resources.

Some examples of the method, apparatuses, and non-transitory computer-readable medium described herein may further include operations, features, means, or instructions for transmitting a sidelink data message within a second subset of resources in a second sensing window corresponding to a second resource selection window of the resource pool and determining that a third subset of resources in the second resource selection window corresponding to the second subset of resources may be available for sidelink data transmission based on the transmitting.

Some examples of the method, apparatuses, and non-transitory computer-readable medium described herein may further include operations, features, means, or instructions for transmitting a sidelink data message within a second subset of resources in a second sensing window corresponding to a second resource selection window of the resource pool and determining that a resource of the second resource selection window may be not available for sidelink transmission based on transmitting the sidelink data message within the second subset of resources in the second sensing window.

In some examples of the method, apparatuses, and non-transitory computer-readable medium described herein, determining that the first subset of resources of the first resource selection window may be available may include operations, features, means, or instructions for determining that the first subset of resources of the first resource selection window may be available for data transmission based on the first subset of resources being assigned a defined signal metric level.

In some examples of the method, apparatuses, and non-transitory computer-readable medium described herein, determining that the first subset of resources of the first resource selection window may be available may include operations, features, means, or instructions for comparing a signal metric value assigned for a priority level of a sidelink data message to be transmitted in the first resource selection window with the defined signal metric level and determining that the first subset of resources of the first resource selection window may be available for sidelink data transmission based on the comparing.

In some examples of the method, apparatuses, and non-transitory computer-readable medium described herein, the first subset of resources may be assigned the defined signal metric level based on the first subset of resources corresponding to a transmission time interval (TTI) within the first sensing window within which the UE operated in the first power state.

Some examples of the method, apparatuses, and non-transitory computer-readable medium described herein may further include operations, features, means, or instructions for identifying a second resource in the first resource selection window that may be available for sidelink data transmission based on the second resource having a measured signal metric level that may be lower than the defined signal metric level.

Some examples of the method, apparatuses, and non-transitory computer-readable medium described herein may further include operations, features, means, or instructions for transmitting a sidelink data message in the second resource in the first resource selection window based on identifying that the measured signal metric level may be lower than the defined signal metric level.

In some examples of the method, apparatuses, and non-transitory computer-readable medium described herein, the defined signal metric level may be a reference signal receive power (RSRP) level.

In some examples of the method, apparatuses, and non-transitory computer-readable medium described herein, identifying the resource reservation configuration may include operations, features, means, or instructions for identifying the resource reservation configuration that indicates a first resource reservation periodicity that may be shorter than a second resource reservation periodicity and determining that the first subset of resources of the first resource selection window may be available based on monitoring a slot in the first sensing window that corresponds to the first resource reservation periodicity.

In some examples of the method, apparatuses, and non-transitory computer-readable medium described herein, determining that the first subset of resources may be available may include operations, features, means, or instructions for determining that the first subset of resources of the first resource selection window may be available based on an instance of the second resource reservation periodicity corresponding to the first sensing window occurring when the UE may be operating in the first power state.

Some examples of the method, apparatuses, and non-transitory computer-readable medium described herein may further include operations, features, means, or instructions for transmitting, within the first subset of resources, a first sidelink control message that includes sidelink control information that includes a grant scheduling a first sidelink data message within the resource pool and transmitting the first sidelink data message based on the grant.

In some examples of the method, apparatuses, and non-transitory computer-readable medium described herein, the transitioning from the first power state to the second power state may include operations, features, means, or instructions for receiving a resource selection trigger and transitioning from the first power state to the second power state based on receiving the resource selection trigger.

In some examples of the method, apparatuses, and non-transitory computer-readable medium described herein, the first power state corresponds to a first bandwidth part (BWP) and the second power state corresponds to a second BWP that may be wider than the first BWP.

In some examples of the method, apparatuses, and non-transitory computer-readable medium described herein, the first power state corresponds to a sleep duration of a discontinuous reception (DRX) cycle and the second power state corresponds to an on duration of the DRX.

DETAILED DESCRIPTION

Figure 1:
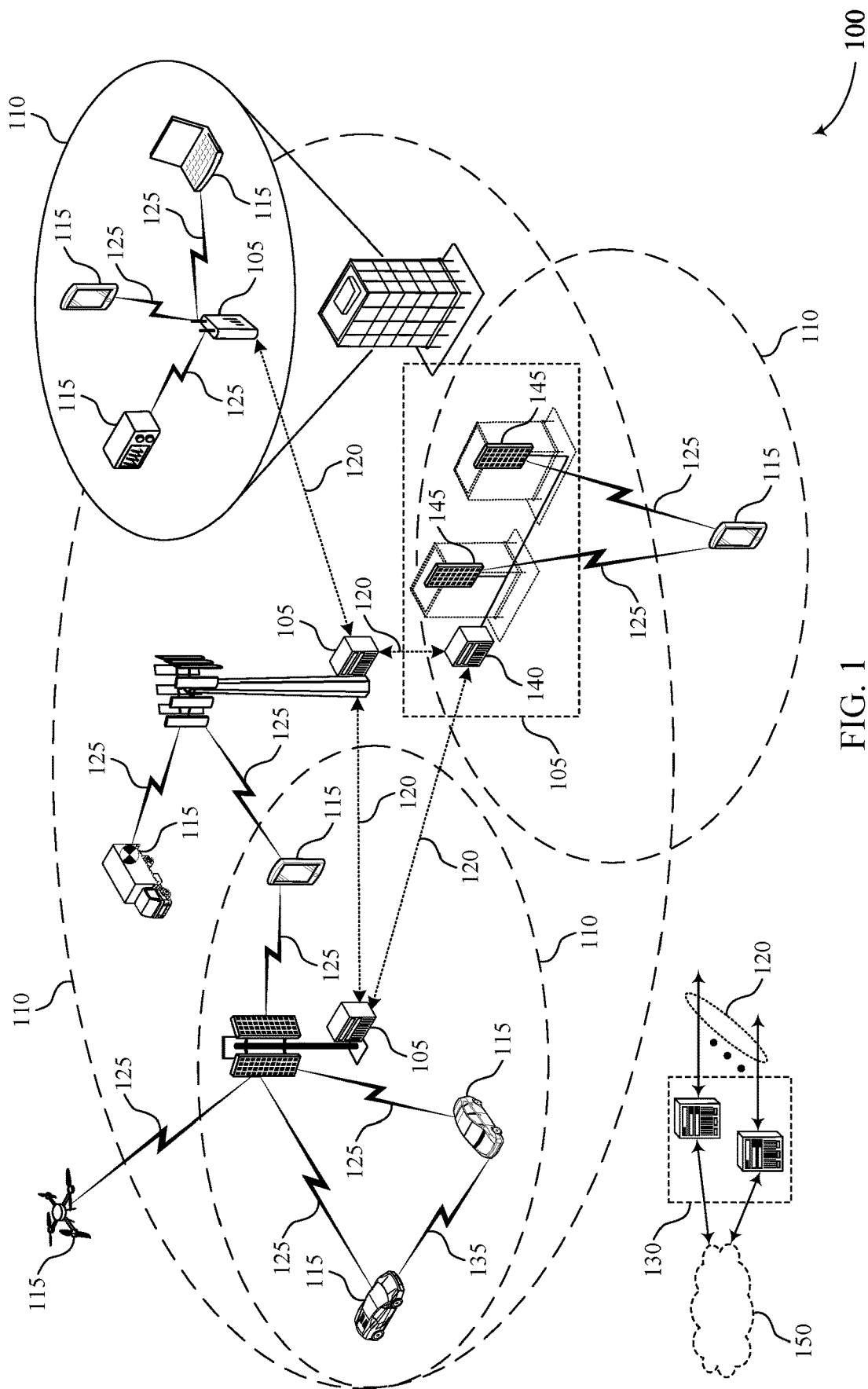
FIG. 1 illustrates an example of a wireless communications system that supports gradual sensing for user equipment (UE) power saving in sidelink operation in accordance with aspects of the present disclosure.

A sidelink communications system may support an autonomous resource allocation mode (e.g., sidelink mode 2 resource allocation), in which sidelink user equipments (UEs) may autonomously select or reserve sidelink resources from a resource pool (e.g., without base station scheduling of the resources). In such cases, a UE may perform channel sensing in a sensing window to determine available sidelink resources for selection from the resource pool. The UE may select sidelink resources autonomously (e.g., perform sidelink resource selection) and may transmit a sidelink message in the selected resources in a resource selection window. Additionally or alternatively, the UE may identify sidelink resources to reserve (e.g., perform sidelink resource reservation) and may signal other UEs indicating the resource reservation. In some cases, a UE may operate in a power saving mode, such as a discontinuous reception (DRX) mode or a bandwidth adaptation mode, during which the UE may transition between low power states (e.g., sleep modes or narrow bandwidth modes) and high power states (e.g., active modes or wide bandwidth modes). In some cases, the low power state and the high power state may also be referred to herein as a first power state and a second power state, respectively (e.g., see below). During low power states, the UE may not perform channel sensing. In some cases, sidelink UEs may be precluded from performing resource selection until after the UE has performed channel sensing, which may result in the UE identifying relatively few, or no available sidelink resources to use for communications, or may result in transmission latency until after the UE performs channel sensing.

To permit sidelink UEs to implement a power saving mode without excessive latency, a UE may transmit a sidelink message in a resource that was not monitored by the UE during a preceding sensing window due to the UE operating in a low power mode (e.g., a sleep mode or a narrow bandwidth mode) for some or all of the preceding sensing window. If the UE is in a low power mode during a sensing window and switches to a second power mode (e.g., an active state) for a resource selection window, the UE may transmit a sidelink control message during the resource selection window, even though the UE did not perform sensing during the preceding sensing window corresponding to the resource selection window. As such, the UE may fail to perform sensing in a transmission time interval (TTI) of the sensing window while operating in a low power mode, and the UE may be permitted to transmit in corresponding resources in a resource selection window due to the low power mode. Additionally or alternatively, the UE may fail to perform sensing in a TTI of the sensing window due to one or more transmissions by the UE in the TTI (e.g., during half-duplex communications), interference in the TTI, or a combination thereof. In some examples, a half-duplex UE may be permitted to transmit in a resource of the resource selection window if the UE failed to perform sensing due to the UE transmitting, instead of sensing, during the sensing window. In other examples, the UE may not transmit sidelink messages in one or more resources that the UE did not sense for any reason other than operating in a low power mode during the corresponding sensing window.

Accordingly, a sidelink UE may transition between a low power state and a high power state to reduce power consumption at the UE, and the sidelink UE may identify available resources for sidelink transmission during the high power state without incurring significant latency.

Aspects of the disclosure are initially described in the context of wireless communications systems. Aspects of the disclosure are described with reference to resource selection schemes, DRX timelines, bandwidth adaptation timelines, resource pool activation timelines, and process flows. Aspects of the disclosure are further illustrated by and described with reference to apparatus diagrams, system diagrams, and flowcharts that relate to gradual sensing for UE power saving in sidelink operation.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a sidelink UE 115 may be configured to transmit sidelink messages in one or more resources of a resource selection window that were not monitored by the UE 115 due to the UE 115 operating in a power saving mode (e.g., a low power mode) during a preceding sensing window. The sidelink UE 115 may identify a resource reservation configuration for communicating within a resource pool (e.g., a set of time and frequency resources) allocated for sidelink communications. In some examples, the UE 115 may operate in a low power state during a sensing window, and the UE 115 may refrain from monitoring a sidelink channel (e.g., performing channel sensing) during the sensing window due to the low power state. The UE 115 may receive a resource selection trigger that may indicate that the UE 115 is to transmit a sidelink message. The UE 115 may transition from the low power state to a high power state to select a resource for performing the sidelink transmission in a resource selection window corresponding to the sensing window that the UE 115 did not monitor. The resource reservation configuration may permit the UE 115 to identify one or more available resources in the resource selection window for sidelink transmission even though the UE 115 did not monitor the corresponding one or more resources in the sensing window due to the UE 115 operating in the low power state.

Figure 2:
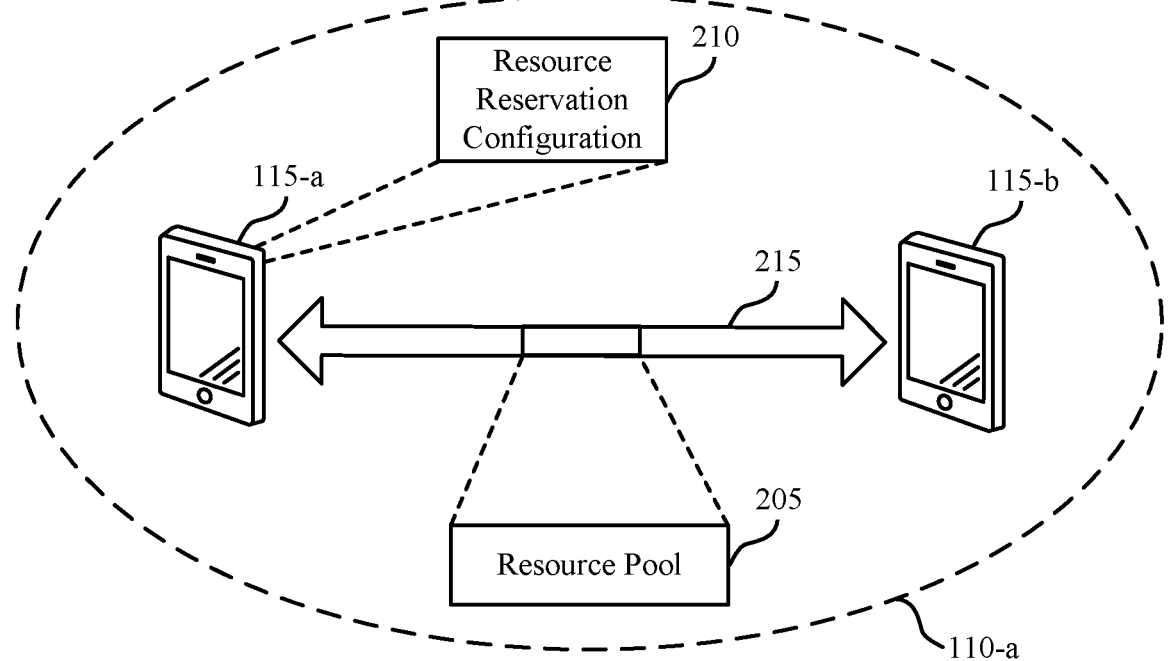
FIG. 2 illustrates an example of a wireless communications system in accordance with aspects of the present disclosure.

FIG. 2 illustrates an example of a wireless communications system 200 in accordance with aspects of the present disclosure. The wireless communications system 200 may include UEs 115-a and 115-b (e.g., among other UEs 115), which may each represent an example of a UE 115 described with reference to FIG. 1. UEs 115-a and 115-b may communicate with each other or with one or more other UEs 115 in a geographic coverage area 110-a via sidelink communication links 215. UE 115-a, UE 115-b, or both, may be configured with a resource reservation configuration 210 for selecting resources from a resource pool 205 to use for sidelink communications.

Sidelink communications (e.g., cellular V2X) over a sidelink communication link 215 (e.g., a physical sidelink shared channel (PSSCH), or another sidelink channel) may operate in a distributed manner (e.g., using autonomous resource allocation, such as sidelink mode 2 resource allocation). For example, UEs 115-a and 115-b may communicate on their own, without any central nodes (e.g., base stations 105) scheduling or assisting with the sidelink communications. For such sidelink communications, a UE 115 may perform channel sensing to determine whether a resource may be used for sidelink communications. The UE 115 may monitor (e.g., and decode) sidelink communications (e.g., sidelink control information (SCI) and/or other transmissions) from other UEs 115. For example, UE 115-a may monitor sidelink communications from UE 115-b via the sidelink communication link 215 (e.g., among other sidelink communications). UE 115-a may monitor sidelink communications when UE 115-a does not transmit, for example, such that UE 115-a may not miss sidelink messages from other UEs 115 (e.g., UE 115-a may support half-duplex communications). In some cases, a UE 115 (e.g., a UE 115 operating in V2X mode 2 resource allocation) that wants to transmit in a resource pool may perform sensing to determine whether a resource can be used. The UE 115 may not select a resource that the UE 115 did not monitor. As such, to identify all available resources, a UE 115 may stay on and continuously monitor a channel for available sidelink resources regardless of whether the UE 115 has data to transmit, which may increase latency and power consumption by the UE 115.

The wireless communications system 200 may support power saving UEs 115. For example, UEs 115-a and 115-b may be configured with one or more power saving enhancements, such as DRX operations (e.g., in a time domain), wakeup signal indication, bandwidth adaptation via BWP switching or via resource pool 205 activation and deactivation (e.g., discontinuous reception in a frequency domain), or the like. While operating in a power saving mode, the UEs 115 may transition between a low power state and a high power state, which may be referred to as a sleep duration and an on duration, or a narrow BWP and a wide BWP, respectively. A UE 115 may transition between the high power state and the low power state periodically, or based on the UE 115 determining it does not have data to receive or transmit. The UE 115 may transition from the low power state to the high power state based on receiving a resource selection trigger indicating that the UE 115 has sidelink data to transmit.

During a low power state, a UE 115 may be unable to monitor a sidelink channel. For example, if UE 115-a enters a low power state, UE 115-a may not monitor one or more resources within the sidelink communication link 215. UE 115-a may receive a resource selection trigger indicating that UE 115-a has sidelink data to transmit (e.g., a packet may arrive for transmission by UE 115-a). UE 115-a may transition to the high power state based on receiving the resource selection trigger to select a resource for performing the sidelink data transmission. UE 115-a may not know which resources of the resource pool 205 are available for the sidelink data transmission in the resource selection window because UE 115-a operated in the low power state, and did not monitor the sidelink channel, during the respective sensing window. In such cases, UE 115-a may be unable to use the resources in the resource selection window for sidelink communications until after UE 115-a performs channel sensing, which may reduce throughput and increase latency associated with sidelink communications at UE 115-a.

To permit sidelink UEs 115, such as UE 115-a, to operate in a power saving mode without incurring increased latency, a sidelink UE 115 may be permitted to transmit sidelink messages in one or more resources of a resource selection window that were not monitored by the UE 115 in a corresponding sensing window due to the UE 115 operating in a low power mode (e.g., a sleep mode or a narrow bandwidth mode). For example, UE 115-a may be configured with a resource reservation configuration 210 for selecting a resource from the resource pool 205 for communicating via the sidelink communication link 215. The resource reservation configuration 210 may permit UE 115-a to select resources of the resource pool 205 that UE 115-a did not monitor while operating in a low power mode during a preceding sensing window (e.g., the resource reservation configuration 210 may configure resource selection exemptions). UE 115-a may select a resource from a subset of the available resources in a resource selection window and transmit a sidelink message in the resource via the sidelink communication link 215.

In some examples, the resource reservation configuration 210 may permit UE 115-a (e.g., a half-duplex UE 115) to transmit a sidelink message in a resource of the resource selection window where the UE 115-a did not monitor a corresponding resource of a preceding sensing window due to transmission of the sidelink message by UE 115-a in the resource of the resource selection window. For example, UE 115-a may transmit a sidelink message during a set of resources in a sensing window of a sidelink channel, and thus the half-duplex UE 115-a did not monitor that set of resources because the UE 115-a instead was transmitting the sidelink message in that set of resources. The resource reservation configuration 210 may permit UE 115-a to transmit sidelink messages in a corresponding resource of a resource selection window of the resource pool 205, even though the half-duplex UE 115-a did not monitor a corresponding resource in the sensing window because the UE 115-a instead was transmitting the sidelink message.

The resource reservation configuration 210 may thereby permit UE 115-a to communicate using resources that UE 115-a did not monitor due to operating in a low power state, or due to transmission by UE 115-a, or both. The techniques for selecting sidelink resources described herein provide for sidelink UEs 115 to operate in a power saving mode without incurring significant latency during sidelink communications.

Figure 3:
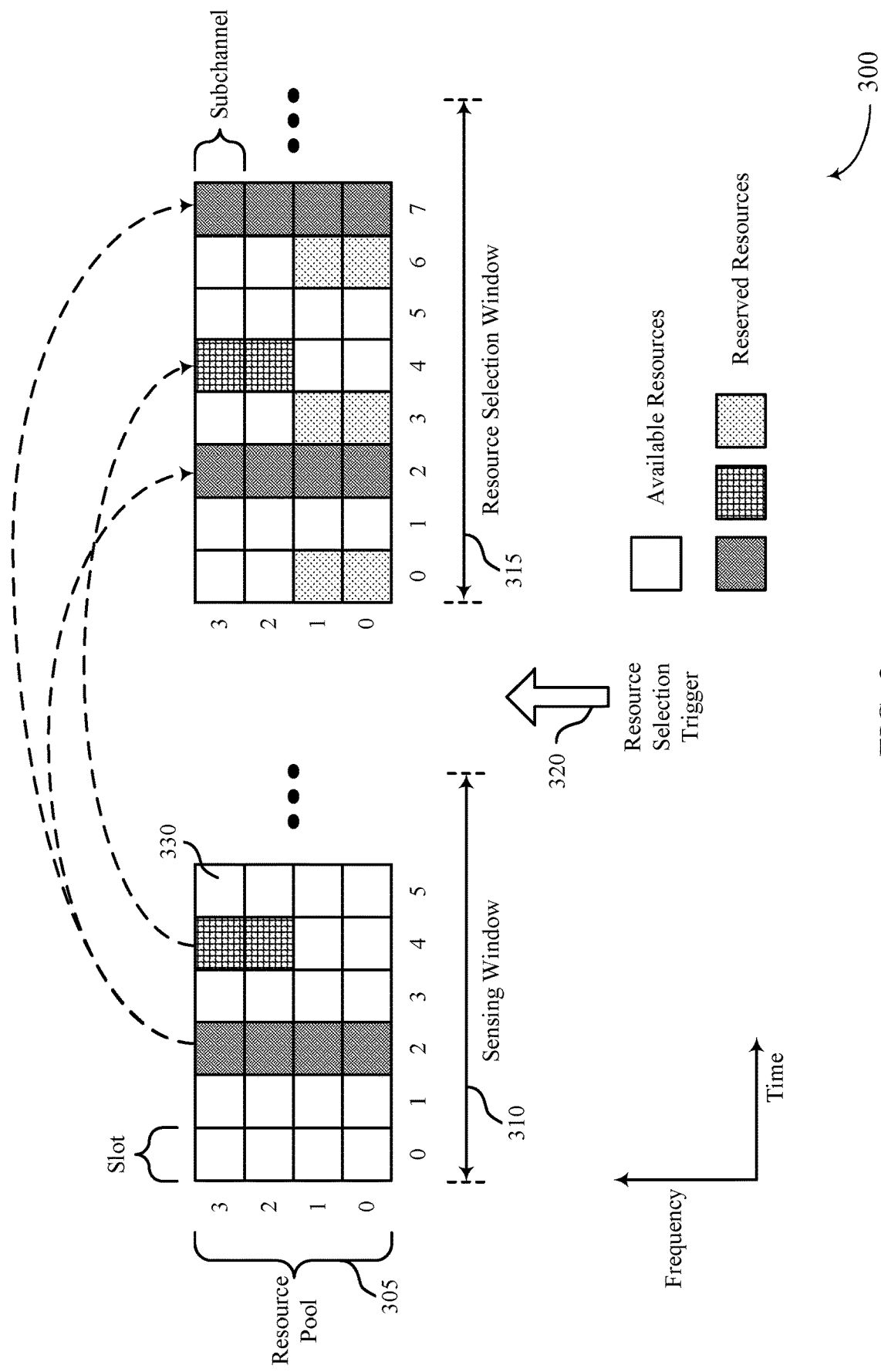
FIG. 3 illustrates an example of a resource selection scheme in accordance with aspects of the present disclosure.

FIG. 3 illustrates an example of a resource selection scheme 300 that supports gradual sensing for UE power saving in sidelink operation in accordance with aspects of the present disclosure. In some examples, the resource selection scheme 300 may represent a selection scheme used by a first UE 115 (e.g., a transmitting UE 115) to select sidelink resources for transmitting a sidelink message. The first UE 115 may communicate with one or more second UEs 115 using resource elements 330 (e.g., time and frequency resources) in a resource pool 305 over a sidelink channel. The first UE 115 and the one or more second UEs 115 may be examples of the UEs 115 described with reference to FIGS. 1 and 2. In some examples, the first UE 115 may be configured with a resource reservation configuration that permits the first UE 115 to transmit in resources that were not monitored by the first UE 115.

Some sidelink communications (e.g., V2X communications, or other device-to-device communications) may support autonomous resource allocation by a UE 115 (e.g., a mode 2 resource allocation). In such cases, a UE 115 (e.g., the first UE 115) may access a channel based on sensing outcomes. For example, the first UE 115 may identify available resources (e.g., time and frequency resources, such as resource elements 330 in slots and subchannels) of a resource pool 305 for a sidelink transmission, which may be referred to as candidate resources. The first UE 115 may select one or more resources for the sidelink transmission from the available resources in the resource pool 305 (e.g., a pool of time and frequency resources).

In the example of the resource selection scheme 300, the first UE 115 may monitor each resource element 330 within the resource pool 305 during a sensing window 310 to identify available resources of the resource pool 305 within a corresponding resource selection window 315 to select for sidelink transmission. All of the resources within slots 0 through 7 and subchannels 0 through 3 of the resource selection window 315 may be included in a candidate set of resources for the first UE 115 to select from. The first UE 115 may exclude one or more resources from the candidate set of resources in the resource selection window 315 based on sensing outcomes from monitoring the sensing window 310. For example, the first UE 115 may monitor for SCI from one or more other sidelink UEs 115 and perform channel sensing to determine a measured signal metric level associated with each resource element 330 in the sensing window 310. The SCI may indicate one or more resources in a resource selection window 315 that may be reserved for a future transmission by another sidelink UE 115. The first UE 115 may exclude the one or more reserved resources from the candidate set, and the first UE 115 may determine that the remaining resources in the resource selection window 315 are available resources of the candidate set based on the SCI grants. The first UE 115 may select a resource from the available resources for transmission of a sidelink message.

The first UE 115 may be configured with a resource selection procedure indicating one or more rules for identifying available resources. A first rule (e.g., in a Step 0 indicated in the one or more rules) may instruct the first UE 115 to initialize the set, $S_A$, of candidate resources (e.g., single-slot resources) in the resource selection window 315. For example, the set of candidate resources may include all of the time and frequency resources within subchannels 0 through 3 and slots 0 through 7 of the resource selection window 315. In some examples, the first UE may project measurement and/or decoding outcomes from the sensing window 310 to the resource selection window 315.

The first UE 115 may subsequently (e.g., in a Step 1 indicated in the one or more rules) exclude one or more resources from the candidate set, $S_A$, if the first UE 115 did not monitor the corresponding resources in the sensing window 310 due to a transmission by the first UE 115, instead of monitoring, in the one or more resources (e.g., the first UE 115 may exclude any resource that may potentially be reserved by a SCI grant). For example, the first UE 115 may transmit a sidelink message in resources within slot 2 and subchannels 0 through 3 of the sensing window 310. Because the first UE 115 transmitted within the resources, and did not monitor the resources, the first UE 115 may exclude the corresponding resources in slot 2 and subchannels 0 through 3 of the resource selection window 315 from the candidate set.

The first UE 115 may exclude all resources that may potentially be reserved by an SCI grant by taking into account a set of configured (e.g., pre-configured) resource reservation periods. For example, the first UE 115 may exclude the resources in slot 7 and subchannels 0 through 3 of the resource selection window 315 from the candidate set based on a period that links the respective resources (e.g., a pre-configured periodicity that may be allowed by a higher layer parameter, such as sl-ResourceReservPeriodList-r16). For example, although the first UE 115 did not monitor the resources in slot 2 of the sensing window 310, a hypothetical SCI grant transmitted by another UE 115 in slot 2 of the sensing window 310 may indicate that resources within slot 2 and slot 7 of the resource selection window 315 may be reserved (e.g., the SCI may include a "Resource reservation period" field set to the identified periodicity value). In this step (e.g., Step 1), if the first UE 115 does not monitor the resources in slot 2 of the sensing window 310, the first UE 115 will not exclude resources in other slots (e.g., resources in slots 0, 1, 3, 4, 5, and 6) of the resource selection window 315 because a potential SCI transmitted in slot 2 of the sensing window 310 cannot reserve any resources in these other slots.

For the remaining resources in the candidate set (e.g., resources $R_{XY} \in S_A$), the first UE 115 may identify whether an SCI detected in the sensing window 310 reserves a resource that is overlapping with any of the remaining resources or any future candidate resources (e.g., in a Step 2 indicated by the one or more rules). The first UE 115 may exclude the reserved resources from the candidate set accordingly. For example, the first UE 115 may detect an SCI in resources within slot 4 and subchannels 2 and 3 of the sensing window 310 that may reserve corresponding resources in slot 4 and subchannels 2 and 3 of the resource selection window 315. The first UE 115 may exclude the resources in slot 4 and subchannels 2 and 3 of the resource selection window 315 from the candidate set accordingly.

The first UE 115 may determine whether any SCI that was detected in the sensing window reserves future candidate resources associated with the remaining resources (e.g., the first UE 115 may identify future resources linked to the remaining resources within the candidate set by a period, $P_{TX}$, such as $R_{XY+jP_{TX}}$). The future candidate resources may be associated with the remaining resources based on a configured period, and the first UE 115 may determine whether any SCI received during the sensing window 310 includes a "resource reservation period" field set to the configured period value. If the SCI indicates future reserved resources based on the configured period, the first UE 115 may exclude the future reserved resources from the candidate set.

If the first UE 115 measures a reference signal receive power (RSRP) level of an SCI received during the sensing window 310, and the measured RSRP is below an RSRP threshold (e.g., a configured RSRP threshold), the first UE 115 may not exclude resources that are reserved by the SCI from the candidate resource set, $S_A$. The first UE 115 may include a resource in the candidate set even if the SCI indicates that the resource will be used by another UE 115. If the measured RSRP is below the RSRP threshold, the first UE 115 determines that a transmission in the one or more resources scheduled by the SCI are unlikely to cause significant interference with a transmission by the first UE 115 in the resource (e.g., the other sidelink UE 115 that transmits in the resources may be relatively far away from the first UE 115, and may be unlikely to interfere with communications by the first UE 115). As such, a resource is excluded from the candidate set if the received RSRP of the SCI scheduling the resource exceeds the RSRP threshold (e.g., depending on a priority of the SCI reservation and a priority of the packet to be transmitted by the first UE 115).

The RSRP threshold may be configured at the first UE 115. In some examples, the RSRP threshold may be a dynamic threshold. For example, the first UE 115 may gradually increase the RSRP threshold until the first UE 115 identifies available resources for performing sidelink communications (e.g., until the first UE 115 identifies an SCI with a measured RSRP level below the RSRP threshold).

After identifying available resources of the resource pool 305 within the resource selection window 315, the first UE 115 may select a resource for transmission of a sidelink message (e.g., a sidelink data message or an SCI to reserve resources for future sidelink data transmission by the first UE 115). The first UE 115 may perform random resource selection from the candidate set of available resources.

When the first UE 115 receives a resource selection trigger 320 (e.g., a packet arrives for transmission from the first UE 115), the first UE 115 may identify the sensing window 310 (e.g., a window in the past) and the resource selection window 315 (e.g., a window in the future), and the first UE 115 may perform resource selection according to the one or more resource selection rules as previously discussed. For example, the first UE 115 may determine a set of available resources in the resource selection window 315 based on SCI decoding and/or RSRP measurement in the sensing window 310 (e.g., the first UE 115 may look back at corresponding resources the first UE 115 monitored in the sensing window 310). The first UE 115 may select a resource from the available resources for transmitting the sidelink data indicated by the resource selection trigger 320. The resource selection trigger 320 may be triggered by a higher layer of the first UE 115. The higher layer may trigger a lower layer of the first UE 115 to transmit a packet.

Accordingly, to perform autonomous resource allocation (e.g., mode 2 allocation), the first UE 115 may monitor one or more sidelink transmissions, perform RSRP measurements, and perform resource selection when such selection is triggered by the resource selection trigger 320 (e.g., resource selection may be triggered by a packet arrival). Because the first UE 115 may not know when a resource selection trigger 320 will arrive, the first UE 115 may continuously monitor a resource pool 305 to determine available resources in the future for potential sidelink transmission by the first UE 115, which may result in relatively high power consumption at the first UE 115. If the first UE 115 refrains from monitoring one or more resources in the resource pool 305 and the first UE 115 subsequently receives a resource selection trigger 320, the first UE 115 cannot transmit sidelink data in corresponding resources in a resource selection window 315, which may increase latency and reduce throughput associated with sidelink communications by the first UE 115.

Some sidelink UEs 115, such as the first UE 115, may operate in a power saving mode, which may include switching between low power states and high power states. During a low power state, the first UE 115 may not monitor resources in the resource pool 305 or perform channel sensing. If the first UE 115 receives the resource selection trigger 320, the first UE 115 transitions from the low power state to the high power state to perform transmission of the sidelink data within a resource selection window 315. But, the first UE 115 may not have monitored resources in the corresponding sensing window 310 during the low power state. As such, after transitioning to the high power state the first UE 115 may monitor resources within the resource selection window 315 to identify available resources prior to selecting a resource for transmission within the resource selection window 315, which may increase latency.

As described herein, the first UE 115 may be configured with exemptions to the one or more rules for identifying available resources such that the first UE 115 may operate in a power saving mode without incurring significant latency. The one or more rules may be conveyed to the first UE 115 via a resource reservation configuration, such as the resource reservation configuration 210 described with reference to FIG. 2. The resource reservation configuration may configure the first UE 115 to operate in a power saving mode without incurring significant latency by permitting the first UE 115 to transmit in resources in the resource selection window 315 that the first UE 115 did not monitor due to the first UE 115 operating in a low power state during the corresponding sensing window 310. In other words, for resource determination in sidelink resource allocation mode 2, if the first UE 115 has not monitored a slot in the sensing window 310 for the resource pool 305 due to power saving (e.g., during a DRX off duration or due to bandwidth adaptation), the first UE 115 may not exclude resources in corresponding slots in the resource selection window 315 that could be reserved by a hypothetical SCI grant during the slot in the sensing window 310 (e.g., the first UE 115 may be provided with an exemption to use a resource without sensing during a power saving period). In one example, Step 1 of the resource selection procedure may be modified to permit such an exemption for resource selection. For example, if the first UE 115 operates in a low power state during the sensing window 310 and subsequently receives the resource selection trigger 320, the first UE 115 may transition to a high power state and select a resource in the resource selection window 315 for sidelink transmission even though the first UE 115 did not monitor a corresponding resource in the sensing window 310 due to the low power state. Such techniques for resource selection may provide for the power saving first UE 115 to use a resource without sensing during a power saving period.

In some examples, the resource reservation configuration may permit the first UE 115 to select a resource in the resource selection window 315 for transmission that the first UE 115 did not monitor due to transmission by the first UE 115 in that resource during the sensing window 310 (e.g., the first UE 115 may not exclude all resources in the resource selection window 315 that could potentially be reserved by a hypothetical SCI grant). For example, if the first UE 115 (e.g., a half-duplex UE 115) transmits in resources within slot 2 and subchannels 0 through 3 of the sensing window 310, instead of monitoring the resources, the first UE 115 may be permitted to include corresponding resources in slot 2 and subchannels 0 through 3 within the resource selection window 315 in the set of candidate resources (e.g., and corresponding resources in slot 7 and subchannels 0 through 3 of the resource selection window 315 that may be linked by a configured period). In some examples, whether the first UE 115 is permitted to select resources the first UE 115 did not monitor due to transmission may be based on a type of power saving mode the first UE 115 operates in. In one example, the first UE 115 may be permitted to select resources the first UE 115 did not monitor due to transmission during a DRX mode, but the first UE 115 may not select such resources during a bandwidth adaptation mode.

In some examples, a sidelink control message (e.g., SCI) may be transmitted by another UE 115 in the resources of slot 2 and subchannels 0 through 3 or the resources in slot 4 and subchannels 2 and 3 of the sensing window 310, and the sidelink control message may indicate that the corresponding resources in the resource selection window 315 are reserved (e.g., by a hypothetical SCI grant). If the first UE 115 did not receive the SCI due to operating in a low power state or transmission by the first UE 115, the first UE 115 may be permitted to transmit in the reserved resources in the resource selection window 315, which may result in interference between transmissions by the first UE 115 and the second UE 115 in the resources. The resource reservation exemption described herein may thereby allow for some risk of increased interference in the network to provide for reduced power consumption at the first UE 115.

Accordingly, the first UE 115 may perform autonomous resource allocation (e.g., mode 2 allocation) while operating in a power saving mode by selecting a resource when such selection is triggered by the resource selection trigger 320 based on one or more resource reservation exemption rules to reduce power consumption at the first UE 115, improve throughput, and improve the quality of sidelink communications.

Figure 4:
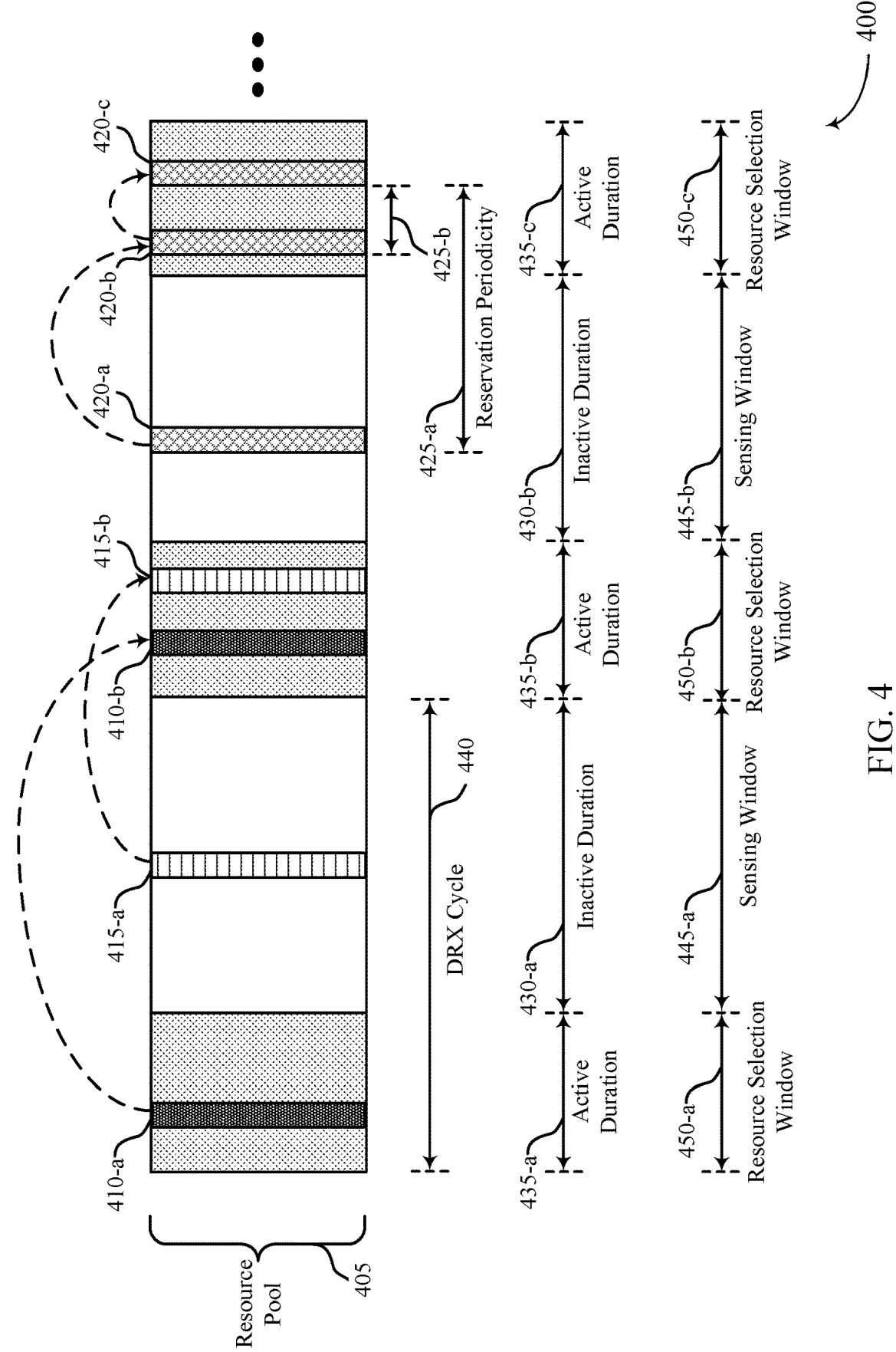
FIG. 4 illustrates an example of a discontinuous reception (DRX) timeline in accordance with aspects of the present disclosure.

FIG. 4 illustrates an example of a DRX timeline 400 in accordance with aspects of the present disclosure. In some examples, the DRX timeline 400 may implement aspects of the wireless communications systems 100 and 200, as described with reference to FIGS. 1 and 2 and the resource selection scheme 300, as described with reference to FIG. 3. For example, the DRX timeline 400 may illustrate operations for resource selection from a resource pool 405 (e.g., a pool of time and frequency resources) by a sidelink UE 115 (e.g., a first UE 115) in a power saving mode. The DRX timeline 400 may be applicable to implementations or instances when the first UE 115 is configured to support resource selection during power saving operations in the temporal domain (e.g., DRX operations).

The DRX timeline 400 may include one or more DRX cycles 440, which may correspond to a set of time resources (e.g., a symbol duration, a slot duration, a subframe duration, a frame duration), as well as a set of frequency resources (e.g., subcarriers, carriers). Each DRX cycle 440 may include an inactive duration 430 (also referred to as a DRX sleep duration) and an active duration 435 (also referred to as a DRX ON duration), which may correspond to time and frequency resources. The first UE 115 may operate in the high power state during each active duration 435 for monitoring a sidelink channel, transmitting data, or both. The first UE 115 may enter a sleep mode (e.g., a low power mode), and may refrain from transmitting or monitoring during each inactive duration 430 to reduce power consumption.

The DRX timeline 400 illustrates three active durations 435 (e.g., active durations 435-a, 435-b, and 435-c), and two inactive durations 430 (e.g., inactive durations 430-a and 430-b) for the first UE 115 that are located periodically in the time domain. Active duration 435-a and inactive duration 430-a may correspond to a first DRX cycle 440 for the first UE 115. Active duration 435-b and inactive duration 430-b may correspond to a second DRX cycle 440 for the first UE 115. Active duration 435-c may correspond to a beginning of a third DRX cycle 440 for the first UE 115.

The first UE 115 may transition between the inactive durations 430 and the active durations 435 periodically or based on signaling. In one example, each inactive duration 430 and active duration 435 may be configured according to respective periods within a DRX cycle 440, and the first UE 115 may transition between states according to the configured periods. In some examples, the first UE 115 may transition between the active durations 435 and the inactive durations 430 periodically regardless of whether the first UE 115 has data to transmit.

In another example, the first UE 115 may receive a wakeup signal indicating the first UE 115 is to transition from the inactive duration 430 to the active duration 435 to transmit data, perform channel sensing, or the like. The wakeup signal may carry an indication of an active duration 435 of the DRX cycle 440 for the first UE 115. The wakeup signal may be transmitted in a pre-wakeup window (not pictured) that may occur before each respective active duration 435 (e.g., the wakeup signal may be configured in addition to DRX) and may include a wakeup signal monitoring period. In some examples, the pre-wakeup window may be part of the DRX cycle 440 to preserve resources (for example, time and frequency resources) or a battery life of the first UE 115, among other advantages. For example, the pre-wakeup window may facilitate power saving advantages of the first UE 115 by reducing unnecessary wakeup occasions for the first UE 115. The first UE 115 may monitor for a wakeup signal during the wakeup signal monitoring occasion in the pre-wakeup window. If the first UE 115 detects a wakeup signal during the pre-wakeup window, the first UE 115 will transition from a low power state to a high power state. If the first UE 115 does not detect a wakeup signal in the pre-wakeup window, the first UE 115 will remain in the low power state or will transition from a high power state to the low power state.

The wakeup signal may be an example of the resource selection trigger 320 described with reference to FIG. 3. The first UE 115 may receive signaling (e.g., a wakeup signal, a resource selection trigger, or some other signaling) indicating that the first UE 115 is to transmit data, and the first UE 115 may transition from a low power state to a high power state to perform resource selection accordingly. It is understood that a UE 115 may transition between any number of active durations 435 and inactive durations 430 that are not illustrated. For instance, the first UE 115 may transition between DRX cycles 440 according to any DRX periods or any signaling received at the UE 115.

A sensing window 445 for the first UE 115 may occur during an inactive duration 430, and a corresponding resource selection window 450 for the first UE 115 may occur during an active duration 435 (e.g., after the first UE 115 receives a resource selection trigger). The resource selection windows 450 (e.g., resource selection windows 450-a, 450-b, and 450-c) and the sensing windows 445 (e.g., sensing windows 445-a and 445-b) may be examples of the sensing window 310 and the resource selection window 315, as described with reference to FIG. 3.

When operating in the DRX power saving mode, the first UE 115 may refrain from monitoring the resource pool 405 in a sensing window 445 during each inactive duration 430. The first UE 115 may thereby be unable to identify available resources for sidelink transmission in a corresponding resource selection window 450 when the first UE 115 transitions to an active duration 435. When the first UE 115 transitions to a high power state, the first UE 115 may monitor the resource pool 405 within the active duration 435 before performing sidelink transmission, which may increase latency. For example, the first UE 115 may refrain from monitoring resources within TTI 415-a in sensing window 445-a due to a low power state of the first UE 115 during inactive duration 430-a. As such, the first UE 115 may not obtain sensing information for the resources, and may be unable to select corresponding resources in TTI 415-b in resource selection window 450-b for transmission. The first UE 115 may perform channel sensing during resource selection window 450-b before identifying available resources, which may result in increased latency associated with sidelink communications.

As described herein, the first UE 115 may be configured (e.g., via a resource reservation configuration) with one or more resource reservation exemptions for the first UE 115 when the first UE 115 operates in a power saving mode, such as a DRX mode. The resource reservation configuration may permit the first UE 115 to select one or more resources in a resource selection window 450 that were not monitored by the first UE 115 during a corresponding sensing window 445 due to the UE 115 operating in a low power state, as described with reference to FIGS. 2 and 3. For example, the first UE 115 may not monitor resources in TTI 415-a (e.g., a slot, a symbol, or some other quantity of time and frequency resources) due to the first UE 115 operating in a low power state (e.g., a DRX off state) during sensing window 445-a within inactive duration 430-a. But, the first UE 115 may be permitted to include the corresponding resources in TTI 415-b in a candidate set of available resources for sidelink transmission in resource selection window 450-b within active duration 435-b based on the first UE 115 operating in the low power state.

In some examples, the resource reservation configuration may permit the first UE 115 to transmit sidelink data in resources that the first UE 115 did not monitor due to a transmission by the first UE 115. For example, the first UE 115 may transmit sidelink data in TTI 410-a during active duration 435-a. The first UE 115 may support half-duplex operations and may not monitor the resources in TTI 410-a due to the transmission by the first UE 115. If the resource reservation configuration indicates that resources that were not monitored due to transmission by the UE 115 are exempt from sensing, the first UE 115 may determine that the resources in TTI 410-b in a subsequent active duration 435-b are available for sidelink transmission by the first UE 115. The resource selection exemptions for transmission may be based on a type of power saving mode that the first UE 115 operates in. For example, the resources in TTI 410-a that the first UE 115 transmitted in, instead of monitoring, may be identified as available resources (e.g., exempt resources) for the first UE 115 if the first UE 115 operates in a DRX power saving mode, as illustrated in FIG. 4. In some examples, the resources in TTI 410-a, or another TTI that the first UE 115 transmitted in in active duration 435-a or inactive duration 430-a, may not be identified as available resources if the first UE 115 operates in a bandwidth adaption power saving mode, or some other power saving mode.

If the first UE 115 receives a sidelink control message (e.g., SCI) from another UE 115 that reserves resources, such as resources in TTIs 410-b or 415-b, in a resource selection window 450-b, the first UE 115 will continue to exclude the reserved resources from the candidate set (e.g., regardless of the resource reservation configuration).

In some examples, the resource reservation configuration for the first UE 115 may indicate that the resource reservation exemption for a power saving UE 115 is applicable to a subset of resource reservation periodicities 425. For example, the first UE 115 may be configured with a set of resource reservation periodicities 425 (e.g., periodicities with durations of 10 ms, 100 ms, 1 second, or some other duration). The first UE 115 may be exempted to exclude resources in a TTI from a candidate resource set for a subset of resource reservation periodicities 425 (e.g., 100 ms and 1 second, or some other subset of periodicities) of the set of configured resource reservation periodicities 425, but may not be exempted from excluding resources in the TTI from the candidate resource set for remaining periodicities in the set (e.g., a 10 ms periodicity). The resource reservation periodicities 425 may be indicated to the UE via signaling from a base station 105 (e.g., during network-controlled sidelink operations, such as Mode 1 sidelink communication), or the resource reservation periodicities 425 may be configured at the first UE 115 (e.g., the periodicities may be pre-loaded to the UE 115 during manufacturing).

In the example of the DRX timeline 400, the first UE 115 may be configured with resource reservation periodicities 425-a, 425-b, and one or more other resource reservation periodicities 425. The time and frequency resources in TTIs 420-a, 420-b, and 420-c may be linked according to the respective resource reservation periodicities 425. Resource reservation periodicity 425-a may be included in the subset of exempted resource reservation periodicities 425 indicated by the reservation configuration and resource reservation periodicity 425-b may not be included in the subset. Accordingly, the first UE 115 may be exempted to exclude resources in TTI 420-c for resource reservation periodicity 425-a, but the first UE 115 may not be exempted to exclude resources in TTI 420-c for resource reservation periodicity 425-b. If the first UE 115 does not monitor TTI 420-a during sensing window 445-b (e.g., due to a low power state of the first UE 115 during inactive duration 430-b), the first UE 115 may determine that resources in TTI 420-c are available for sidelink transmission in resource selection window 450-c (e.g., the first UE 115 may be allowed to use the resources in TTI 420-c). However, if the first UE 115 does not monitor resources in TTI 420-b during active duration 435-c (e.g., or during another sensing window 445 (not pictured)), the first UE 115 may not include resources in TTI 420-c in the set of available resources for sidelink transmission in resource selection window 450-c (e.g., because the first UE 115 did not monitor within resource reservation periodicity 425-b).

In other words, if a subset of resource reservation periodicities 425 are indicated in the resource reservation configuration, the first UE 115 can refrain from monitoring resources during the indicated subset of resource reservation periodicities 425, but the first UE 115 monitors resources in the resource pool 405 during the resource reservation periodicities 425 that were not indicated in the subset in order to transmit in corresponding resources in a resource selection window 450. In some examples, the resource reservation periodicities 425 that are identified in the subset may be longer than the remaining resource reservation periodicities 425. As such, by including or exempting resources from a candidate set of available resources according to the indicated subset of resource reservation periodicities 425, the first UE 115 may perform channel sensing for at least a configured duration before using resources in the resource selection window 450 (e.g., the first UE 115 may perform channel sensing for at least 10 ms, or some other periodicity, before using resources in the resource pool 405). Such techniques may provide for gradual sensing by the first UE 115. For example, the first UE 115 may perform no sensing and random resource selection in the beginning of the resource selection window 450, and the first UE 115 may perform full sensing of the resource pool 405 by the end of the resource selection window 450.

In some examples, the first UE 115 may be permitted to use resources in the resource selection window 450 based on a defined signal metric level (e.g., RSRP level). Instead of including all of the resources that the first UE 115 did not monitor during an inactive duration 430 (e.g., a low power state), the first UE 115 may assume that each of the resources in the sensing window 445 that the first UE 115 did not monitor have a received RSRP value corresponding to a configured signal metric level. The first UE 115 may apply the defined RSRP level (e.g., X decibel milliwatts (dBm)) to all resources in the sensing window 445 that the first UE 115 did not monitor during the low power state. For example, the first UE 115 may assume that a measured RSRP level for the resources in sensing window 445-a that the first UE 115 did not monitor during inactive duration 430-a is the same as the defined RSRP level. As described with reference to FIG. 3, the first UE 115 may compare an RSRP measurement for each resource in sensing window 445-a (e.g., a measured RSRP level for one or more SCI grants received in sensing window 445-a) with a RSRP threshold to identify resources that are available for sidelink transmission in a corresponding resource selection window 450-b. In some examples, the RSRP threshold may be lower than the defined signal metric level. In such cases, if the first UE 115 identifies one or more resources in sensing window 445-a that are associated with a measured RSRP value that is lower than the threshold (e.g., the first UE 115 may have performed channel sensing on the one or more resources), the first UE 115 will prioritize those resources, and the first UE 115 may determine that those resources are available.

Additionally or alternatively, the first UE 115 may determine that no resources are available due to the defined RSRP value that was applied to each resource the first UE 115 did not monitor in sensing window 445-a during inactive duration 430-a being higher than the RSRP threshold. The first UE 115 may gradually raise the RSRP threshold until the first UE 115 identifies available resources. In some examples, the first UE 115 may raise the RSRP threshold above the defined RSRP value, and the first UE 115 may determine that each of the resources that the first UE 115 did not monitor during sensing window 445-*a* are available for sidelink data transmission in resource selection window 450-*b*. By starting with a small RSRP threshold and increasing the RSRP threshold gradually, the first UE 115 may prioritize the use of resources that the first UE 115 has performed sensing for over resources that the first UE 115 has not performed sensing for.

In some examples, the RSRP threshold may be determined based on a priority of the data traffic the first UE 115 is to transmit. If the first UE 115 has high priority data to transmit in resource selection window 450-*a*, the RSRP threshold may be relatively high, such that the first UE 115 may select an arbitrary resource from the resource set in resource selection window 450-*a* (e.g., a relatively large number of resources, or all of the resources, in resource selection window 450-*a* may be associated with a measured RSRP level that is smaller than the RSRP threshold). If the data to be transmitted by the first UE 115 is low priority data traffic, the RSRP threshold may be decreased (e.g., a low RSRP threshold), which may limit the resources that can be selected by the first UE 115 (e.g., fewer resources in resource selection window 450-*a* may meet the RSRP threshold). Accordingly, the first UE 115 may prioritize transmission of high priority traffic over low priority traffic.

The first UE 115 may be permitted to use a resource if the first UE 115 has higher priority data to transmit than the priority of the data traffic in the resource. For example, if data traffic to be transmitted within TTI 415-*b* is associated with a first priority level, and the first UE 115 is preparing to transmit a packet with a second priority that is lower than the first priority level, the first UE 115 may not use the resources in TTI 415-*b* for transmitting the packet. If the first UE 115 is preparing to transmit a packet with a third priority that is higher than the first priority level, the first UE 115 may transmit the packet using the resources in TTI 415-*b*.

A sidelink UE 115 may thereby be configured with a resource reservation configuration that permits the sidelink UE 115 to transmit in resources that the UE 115 did not monitor during a low power state to provide for reduced power consumption by the UE 115 without incurring significant latency.

Figure 5:
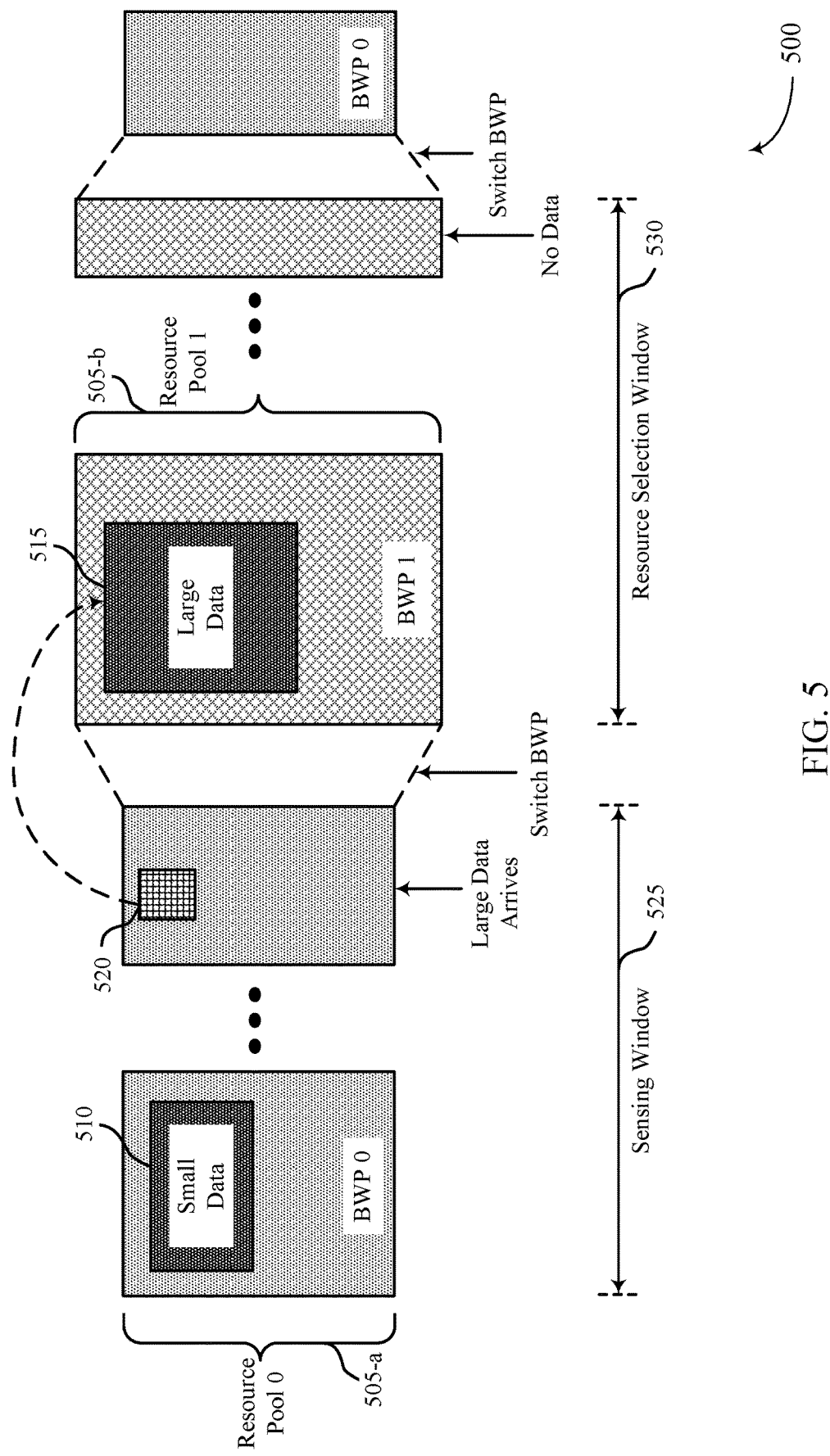
FIG. 5 illustrates an example of a bandwidth adaptation timeline in accordance with aspects of the present disclosure.

FIG. 5 illustrates an example of a bandwidth adaptation timeline 500 in accordance with aspects of the present disclosure. In some examples, the bandwidth adaptation timeline 500 may implement aspects of the wireless communications systems 100 and 200, as described with reference to FIGS. 1 and 2 and the resource selection scheme 300, as described with reference to FIG. 3. For example, the bandwidth adaptation timeline 500 may illustrate operations for resource selection from a resource pool 505 by a sidelink UE 115 (e.g., a first UE 115) in a power saving mode. The bandwidth adaptation timeline 500 may be applicable to implementations or instances when the first UE 115 is configured to support resource selection during power saving operations in the frequency domain, which may be referred to as bandwidth adaptation.

The bandwidth adaptation timeline 500 may illustrate operations by the first UE 115 in a bandwidth adaptation mode (e.g., a mechanism for reducing power consumption at the first UE 115). The first UE 115 may operate in a low power state (e.g., a narrow bandwidth mode) and may transition to a high power state (e.g., a wide bandwidth mode). The low power state may correspond to the first UE 115 communicating using a first resource pool 505-*a* (e.g., resource pool 0) associated with a first BWP (e.g., BWP0), and the high power state may correspond to the UE 115 communicating using a second resource pool 505-*b* (e.g., resource pool 1) associated with a second BWP (e.g., BWP1) that may be wider than the first BWP in the frequency domain (e.g., the second BWP may include more carriers, subcarriers, or the like, than the first BWP). In some examples, the first UE 115 may operate in the low power state and monitor time and frequency resources in the first resource pool 505-*a* until the first UE 115 has large data 515 to transmit. The first UE 115 may transmit relatively small data traffic, such as the small data 510 in a number of time and frequency resources within resource pool 505-*a* and the corresponding first BWP.

The first UE 115 may operate in the high power state when the first UE 115 has data packets to transmit that are relatively large, such as the large data 515. The large data 515 may occupy a number of time and frequency resources within resource pool 505-*b* that may be greater than the number of time and frequency resources occupied by the small data 510 (e.g., resource pool 505-*b* may occupy a total number of time and frequency resources in a channel or subchannel, and resource pool 505-*a* may occupy a subset of the total number of resources). The first UE 115 may save power by using fewer time and frequency resources for communications in the first resource pool 505-*a* associated with the first BWP than the time and frequency resources in the second resource pool 505-*b* associated with the second BWP.

The BWP sizes may be configured at the first UE 115, and the first UE 115 may transition between BWPs periodically or based on signaling received at the first UE 115, such as a resource selection trigger 320, as described with reference to FIG. 3. The bandwidth adaptation timeline 500 may include a sensing window 525 and a resource selection window 530, which may be examples of the sensing windows and resource selection windows described with reference to FIGS. 3 and 4. The first UE 115 may operate in the low power state during the sensing window 525 and transition to operating in the high power state during the resource selection window 530. At 520, the first UE 115 may receive a resource selection trigger indicating that the first UE 115 has a relatively large data packet to transmit (e.g., indicating that the large data 515 arrives). The first UE 115 may switch BWPs based on the resource selection trigger to operate in the high power state within the second BWP. The first UE 115 may perform the BWP switch within a time duration (e.g., a gap or offset time) between the sensing window 525 and the resource selection window 530.

In some cases, the first UE 115 may identify available resources in the resource selection window 530 for transmitting the large data 515 (e.g., sidelink data) based on a channel sensing procedure, as described with reference to FIG. 3. However, the first UE 115 may not have performed channel sensing in the sensing window 525 prior to the resource selection window 530 due to the first UE 115 operating in the low power state (e.g., the narrow bandwidth mode). Additionally or alternatively, the first UE 115 may not have performed channel sensing for all of the resources in resource pool 505-*b* due to operating in the low power state within resource pool 505-*a* (e.g., the first UE 115 may not have monitored all of the time and frequency resources that are included in resource pool 505-*b*). Accordingly, the first UE 115 may be unable to identify available resources for transmitting the large data 515 in resource pool 505-*b* until the first UE 115 performs channel sensing in the resource selection window 530, which may increase latency associated with communications by the first UE 115.

As described with reference to FIGS. 2 through 4, the first UE 115 may be permitted to transmit sidelink data in resources that the first UE 115 did not monitor while operating in a low power state. The first UE 115 may identify a set of available resources in the resource selection window 530 that correspond to one or more resources that the first UE 115 did not monitor in the sensing window 525 (e.g., resources that may occupy the second BWP in the frequency domain). The first UE 115 may select one or more available resources for transmission of the large data 515 in the resource selection window 530. The first UE 115 may transition back to the low power state by switching from the second BWP to the first BWP after the first UE 115 transmits the large data 515.

Accordingly, the first UE 115 may reduce power consumption by operating within a small resource pool 505-a corresponding to a small BWP (e.g., BWP0) until the first UE 115 has large data 515 to transmit. By transmitting the large data 515 in a resource that the first UE 115 did not monitor while operating in a low power state within resource pool 505-a, the first UE 115 may reduce power consumption and increase throughput without incurring significant latency during sidelink communications by the first UE 115.

Figure 6:
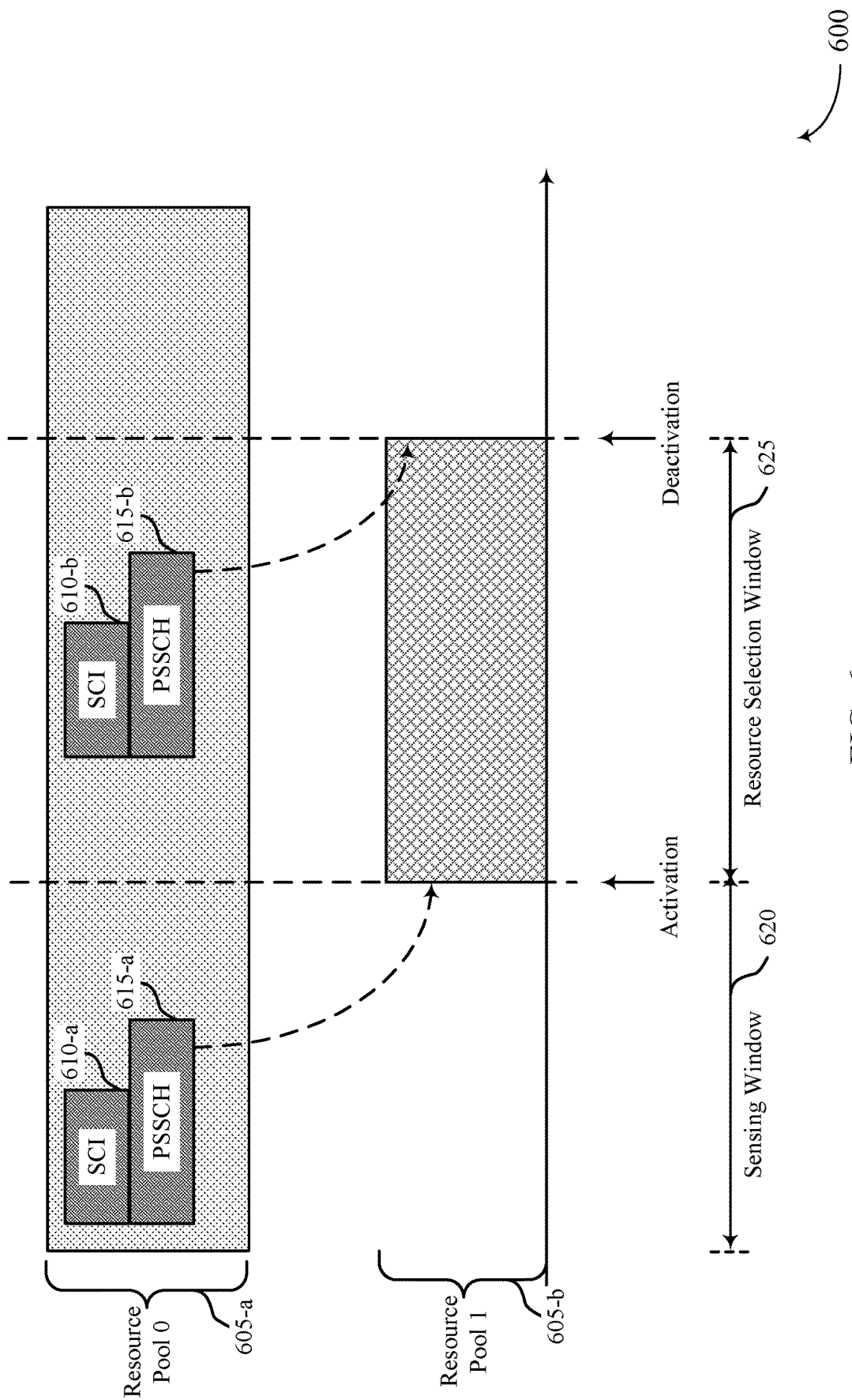
FIG. 6 illustrates an example of a resource pool activation timeline in accordance with aspects of the present disclosure.

FIG. 6 illustrates an example of a resource pool activation timeline 600 in accordance with aspects of the present disclosure. In some examples, the resource pool activation timeline 600 may implement aspects of the wireless communications systems 100 and 200, as described with reference to FIGS. 1 and 2. For example, the resource pool activation timeline 600 may illustrate operations for resource selection from one or more resource pools 605 by a sidelink UE 115 (e.g., a first UE 115) in a power saving mode, as described with reference to FIGS. 1 through 5. The resource pool activation timeline 600 may be applicable to implementations or instances when the first UE 115 is configured to support resource selection during power saving operations that include switching between resource pools 605.

The first UE 115 may operate according to the resource pool activation timeline 600 by activating or deactivating a resource pool 605 based on data traffic. The first UE 115 may be configured with one or more resource pools 605, such as a primary resource pool 605-a (e.g., resource pool 0) and a secondary resource pool 605-b (e.g., resource pool 1). Each resource pool 605 may include a number of resources in the time and frequency domain. The primary resource pool 605-a and the secondary resource pool 605-b may include a same quantity of time and frequency resources or a different quantity of time and frequency resources (e.g., a different quantity of subchannels, channels, BWPs, slots, symbols, or the like). The first UE 115 may activate or deactivate secondary resource pool 605-b periodically or based on signaling received at the first UE 115, such as a resource selection trigger indicating the first UE 115 has data to transmit, as described with reference to FIGS. 3 through 5.

The first UE 115 may continuously monitor the primary resource pool 605-a. The first UE 115 may not monitor the secondary resource pool 605-b continuously to reduce power consumption. The resource pool activation timeline 600 may include a sensing window 620 and a resource selection window 625, which may be examples of a sensing window and resource selection windows described with reference to FIGS. 3-5. The first UE 115 may monitor the primary resource pool 605-a during the sensing window 620, and the first UE 115 may concurrently monitor both the primary resource pool 605-a and the secondary resource pool 605-b during the resource selection window 625. The concurrent monitoring or use of the resource pools 605 may correspond to a high power state of the first UE 115.

If the first UE 115 receives a resource selection trigger indicating that the first UE 115 has large data to transmit (e.g., data that may occupy more time and frequency resources than are available in the primary resource pool 605-a), the first UE 115 may activate the secondary resource pool 605-b. For example, the first UE 115 may activate the secondary resource pool 605-b at another sidelink UE 115 that may receive the data transmission from the first UE 115. The first UE 115 may transmit an indication of the resource pool activation via SCI 610-a or a PSSCH 615-a. In some cases, the first UE 115 may be unable to identify available resources in the secondary resource pool 605-b during the resource selection window 625 because the first UE 115 did not monitor corresponding resources in secondary resource pool 605-b during the sensing window 620 (e.g., while operating in the low power state), which may increase latency associated with the sidelink communications.

As described with reference to FIGS. 2 through 5, the first UE 115 may be permitted to transmit in a set of resources in secondary resource pool 605-b that the first UE 115 did not monitor in the sensing window 620 while operating in the low power state (e.g., while secondary resource pool 605-b is deactivated). Accordingly, the first UE 115 may refrain from monitoring secondary resource pool 605-b during the sensing window 620 to reduce power consumption, and the first UE 115 may subsequently activate secondary resource pool 605-b at another receiving UE 115 and transmit data to the receiving UE 115 using one or more resources in secondary resource pool 605-b (e.g., even though the first UE 115 did not perform channel sensing on the one or more resources).

The first UE 115 may deactivate secondary resource pool 605-b after transmitting the sidelink data and return to the low power state. The first UE 115 may transmit an indication of the deactivation of the secondary resource pool 605-b via SCI 610-b or PSSCH 615-b in primary resource pool 605-a.

Accordingly, the described techniques provide for a sidelink UE 115 to reduce power consumption by activating and deactivating one or more secondary resource pools 605 based on whether the UE 115 has data to transmit. The UE 115 may perform efficient sidelink communication during the power saving mode by transmitting in resources in the secondary resource pools 605 that the UE 115 did not monitor while operating in a low power state (e.g., while monitoring a single resource pool 605).

Figure 7:
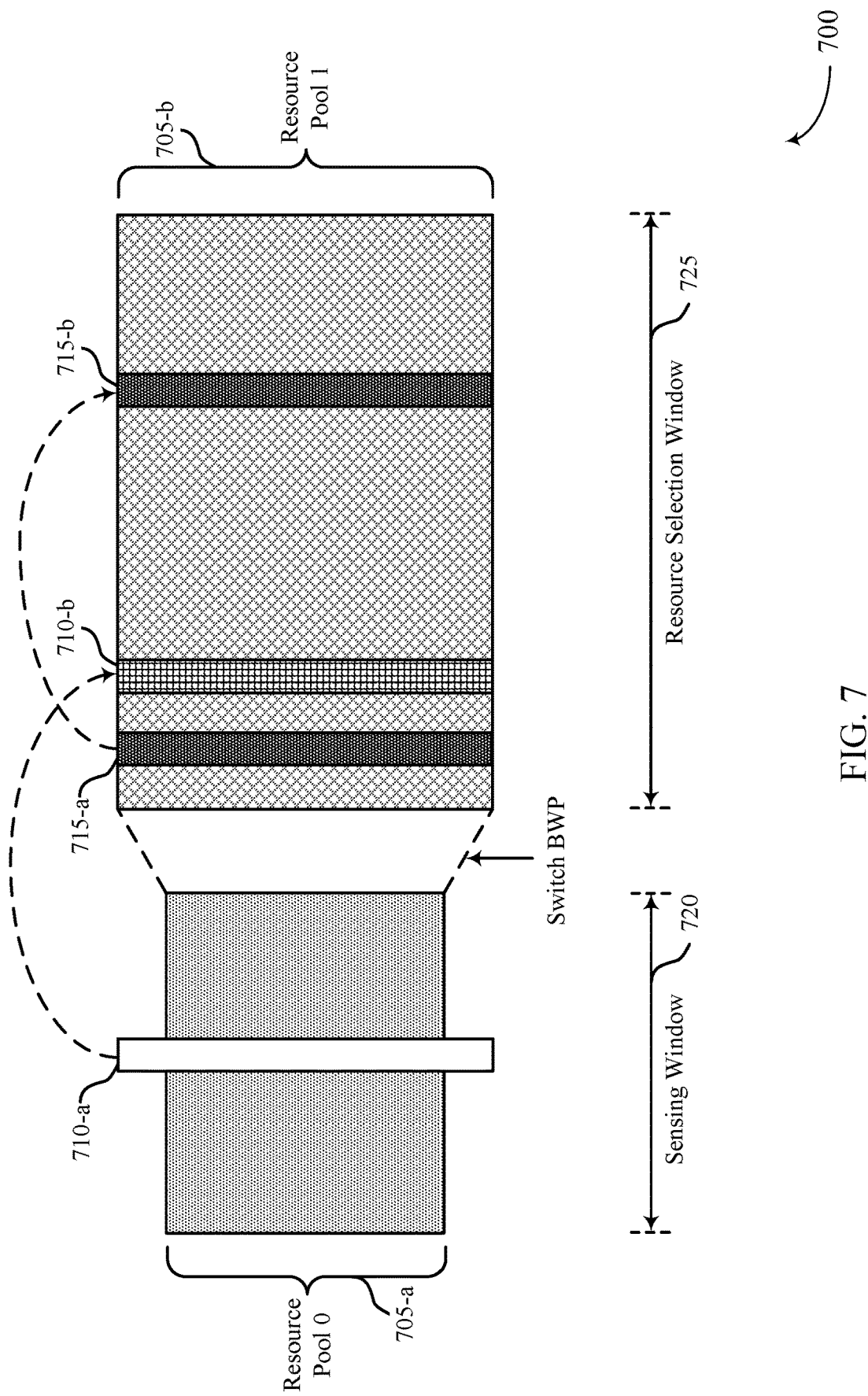
FIG. 7 illustrates an example of a bandwidth adaptation timeline in accordance with aspects of the present disclosure.

FIG. 7 illustrates an example of a bandwidth adaptation timeline 700 in accordance with aspects of the present disclosure. In some examples, the bandwidth adaptation timeline 700 may implement aspects of the wireless communications systems 100 and 200, as described with reference to FIGS. 1 and 2. For example, the bandwidth adaptation timeline 700 may implement aspects of resource selection by a sidelink UE 115 operating in a power saving mode, as described with reference to FIGS. 1 through 6. The bandwidth adaptation timeline 700 may be an example of the bandwidth adaptation timeline 500, as described with reference to FIG. 5, and the bandwidth adaptation timeline 700 may be applicable to implementations or instances when the first UE 115 is configured to support resource selection during power saving operations in the frequency domain, which may be referred to as bandwidth adaptation.

As described with reference to FIG. 5, a first UE 115 operating in a bandwidth adaptation mode may transition between a first resource pool 705-a (e.g., resource pool 0 and a corresponding first BWP 0) and a second resource pool 705-b (e.g., resource pool 1 and a corresponding second BWP 1) that may include more time and frequency resources than the first resource pool 705-a. The first UE 115 may operate in a low power state by using and monitoring a first quantity of time and frequency resources within resource pool 705-a during a sensing window 720. The first UE 115 may transition to a high power state by using and monitoring a greater quantity of time and frequency resources in resource pool 705-b during a resource selection window 725.

As described with further reference to FIG. 5, the first UE 115 may receive a resource selection trigger indicating arrival of a data packet to be transmitted by the first UE 115. The data packet may occupy more resources than are available in resource pool 705-a, and the first UE 115 may switch BWP (or a resource pool 705) based on the resource selection trigger to transmit the large data in the greater quantity of time and frequency resources within resource pool 705-b. As described with reference to FIGS. 2 through 6, to reduce power consumption without incurring increased latency during sidelink communications, the first UE 115 may be permitted to transmit sidelink data during the resource selection window 725 using one or more resources in resource pool 705-b that the first UE 115 did not monitor due to operating in the low power state.

In the example of the bandwidth adaptation timeline 700, the first UE 115 may refrain from monitoring all of the time and frequency resources in TTI 710-a during the sensing window 720. For example, the first UE 115 may not monitor any resources (e.g., frequency resources) in the second BWP (e.g., BWP 0 in resource pool 705-b) during TTI 710-a, but the first UE 115 may monitor resources in the first BWP (e.g., BWP 1 in resource pool 705-a) during TTI 710-a (e.g., TTI 710-a may represent an interval of resources in the time domain). The resources in TTI 710-a may correspond to the resources in TTI 710-b during the resource selection window 725. One or more of the resources in TTI 710-b may be located outside of resource pool 705-a (e.g., frequency resources in TTI 710-b may be located outside of the narrow BWP 0 and may occupy more BWPs, subchannels, channels, or the like, than resource pool 705-a). During the low power state, the first UE 115 may monitor resources within resource pool 705-a, and may not obtain sensing information for each of the resources in TTI 710-a that are outside of resource pool 705-a (e.g., the first UE 115 may not monitor for SCI transmitted in one or more of the frequency resources outside of the narrow BWP 0 during TTI 710-a). In some examples, the first UE 115 may not monitor any of the resources in TTI 710-a during the sensing window 720, and the first UE 115 may be permitted to transmit in corresponding resources in TTI 710-b during the resource selection window 725 due to the low power state. Additionally or alternatively, the first UE 115 may monitor some of the resources within TTI 710-a that are within resource pool 705-a (e.g., resources in frequency ranges that are within the narrow BWP of resource pool 0), but the first UE 115 may not monitor the resources in TTI 710-a that are outside of resource pool 705-a (e.g., resources in frequency ranges that are outside of the narrow BWP, but within the wide BWP of resource pool 1). The first UE 115 may be permitted to perform resource selection within the monitored resources of TTI 710-b that are within resource pool 705-a as well as the unmonitored resources of TTI 710-b that are within frequency ranges outside of resource pool 705-a and within resource pool 705-b due to the low power state of the first UE 115 during the corresponding TTI 710-a within the sensing window 720.

As the first UE 115 operates in the high power state during the resource selection window 725, the first UE 115 may gradually transition from no sensing to full channel sensing. For example, the first UE 115 may not measure sensing information for resources located near the beginning (e.g., in the temporal domain) of the resource selection window 725 due to operating in a low power state prior to the resource selection window 725. Because the first UE 115 operates in the high power state during the resource selection window, the first UE 115 may begin monitoring one or more resources within the resource selection window 725. The first UE 115 may thereby perform full channel sensing to obtain sensing information for one or more of the resources in a later portion of the resource selection window 725. The resource selection exemption provided for the first UE 115 by the resource reservation configuration may apply for the beginning portion of the resource selection window 725 in which the first UE 115 performs random resource selection (e.g., the exemption may not apply once the first UE 115 transitions to full sensing in the resource selection window 725).

For example, the first UE 115 may operate in the high power state during TTI 715-a, and the first UE 115 may be capable of monitoring the resources in TTI 715-a. The first UE 115 may perform channel sensing for the resources in TTI 715-a to determine whether the corresponding resources in TTI 715-b of the resource selection window 725 are available resources. If the first UE 115 does not monitor the resources in TTI 715-a due to a transmitting, instead of sensing, in TTI 715-a, the resource selection exemption may not apply, and the first UE 115 may be unable to transmit sidelink messages in TTI 715-b (e.g., the resources may be unavailable for sidelink data transmission by the first UE 115).

In some examples, the first UE 115 (e.g., a half-duplex UE 115) may be permitted to perform resource selection in resources that the first UE 115 did not monitor due to a transmission by the first UE 115, instead of monitoring, in the resources. In some examples, the first UE 115 may be configured with a subset of resource reservation periodicities, and the resource reservation exemptions may be applicable to the subset of resource reservation periodicities, as described with reference to FIG. 4. For example, the first UE 115 operating in the bandwidth adaptation mode may perform resource selection within resources of the resource selection window 725 for a subset of configured periodicities, and the first UE 115 may not be permitted to perform resource selection within the resource selection window 725 for remaining periodicities that are not included in the subset. Additionally or alternatively, the first UE 115 operating in the bandwidth adaptation mode may be configured with a defined signal metric level, an RSRP threshold, or a combination thereof, and the first UE 115 may select one or more available resources in the resource selection window 725 based on the signal metric level and the RSRP threshold, as described with reference to FIG. 4. In some examples, the first UE 115 may select a resource in the resource selection window 725 based on a priority of traffic to be transmitted by the first UE 115.

A sidelink UE 115 may thereby be configured to support gradual sensing within a resource selection window 725 while operating in a power saving mode to improve throughput of sidelink communications without incurring latency.

Figure 8:
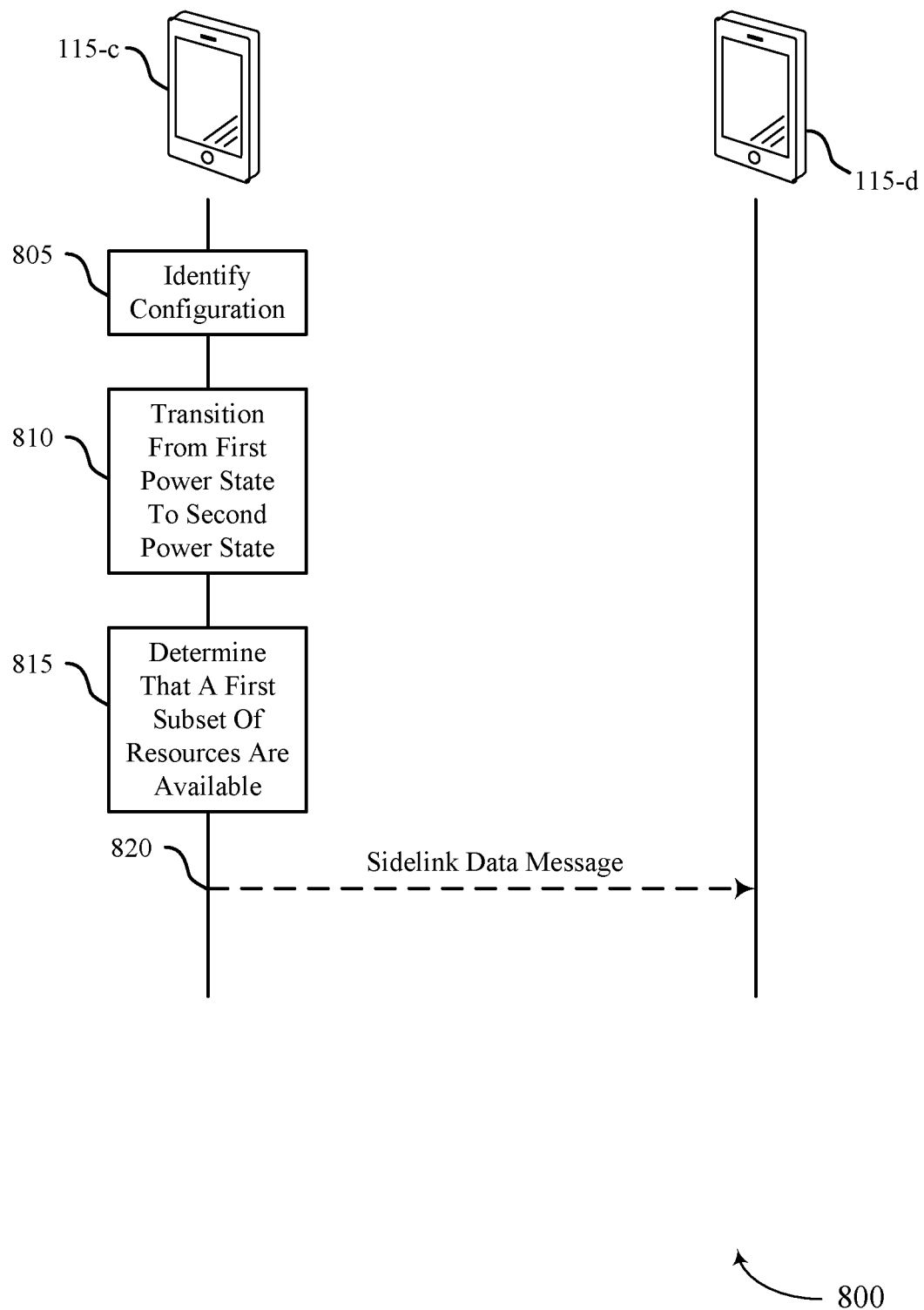
FIG. 8 illustrates an example of a process flow in accordance with aspects of the present disclosure.

FIG. 8 illustrates an example of a process flow 800 in accordance with aspects of the present disclosure. The process flow 800 may implement or be implemented by aspects of the wireless communications systems 100 or 200.

For example, process flow 800 may be implemented by UEs 115-c and 115-d, which may each represent an example of a UE 115 described with reference to FIGS. 1 through 7. Process flow 800 may be implemented by UEs 115-c and 115-d, for example, to identify available resources for sidelink transmission by UE 115-c operating in a power saving mode, as described with reference to FIGS. 2 through 7.

In the following description of the process flow 800, the operations may be performed in a different order than the order shown, or the operations performed by UEs 115-c and 115-d may be performed in different orders or at different times. For example, specific operations may also be left out of the process flow 800, or other operations may be added to the process flow 800. Although UEs 115-c and 115-d are shown performing the operations of the process flow 800, some aspects of some operations may also be performed by one or more other wireless devices.

At 805, UE 115-c may identify a resource reservation configuration for communicating within a resource pool allocated for sidelink communication. The resource reservation configuration may be configured at UE 115-c (e.g., pre-loaded to UE 115-c during manufacturing) or indicated to UE 115-c via signaling from a base station 105.

At 810, UE 115-c may transition from a first power state of a power saving mode to a second power state that consumes more power than the first power state (e.g., from a low power state to a high power state). UE 115-c may perform the transition to the second power state after a first sensing window occurs. The first sensing window may correspond to a first resource selection window of the resource pool of the resource reservation configuration, as described with reference to FIGS. 3-7. In some examples, UE 115-c may transition from the first power state to the second state based on receiving a resource selection trigger. The first power state may be an inactive duration (e.g., a sleep mode) of a DRX cycle, a narrow bandwidth mode of a bandwidth adaptation operation, a first resource pool monitored by UE 115-c, or any combination thereof. The second power state may be an active duration (e.g., an ON duration) of a DRX cycle, a wide bandwidth mode of a bandwidth adaptation operation, first and second resource pools monitored by UE 115-c, or a combination thereof.

At 815, UE 115-c may determine that a first subset of resources of the resource pool in the resource selection window are available for sidelink data transmission. UE 115-c may determine that the first subset of resources are available based on transitioning from the first power state to the second power state. For example, UE 115-c may be permitted to transmit in the first subset of resources that correspond to resources in the sensing window that UE 115-c did not monitor while operating in the low power state.

In some examples, UE 115-c may determine that the first subset of resources are available based on a transmission by UE 115-c, instead of performing sensing, in one or more corresponding resources in the sensing window. Additionally or alternatively, UE 115-c may determine that the first subset of resources are available based on monitoring one or more corresponding resources within a configured resource reservation periodicity, or based on a signal metric level associated with the first subset of resources.

At 820, UE 115-c may select a resource from the first subset of available resources and may transmit a sidelink data message to UE 115-d within the resource. In some examples, UE 115-c may transmit a sidelink control message (e.g., SCI) to UE 115-d within the resource, and the sidelink control message may include a grant that reserves corresponding resources for one or more future sidelink data transmissions by UE 115-c (e.g., a SCI grant scheduling a sidelink data message).

Figure 9:
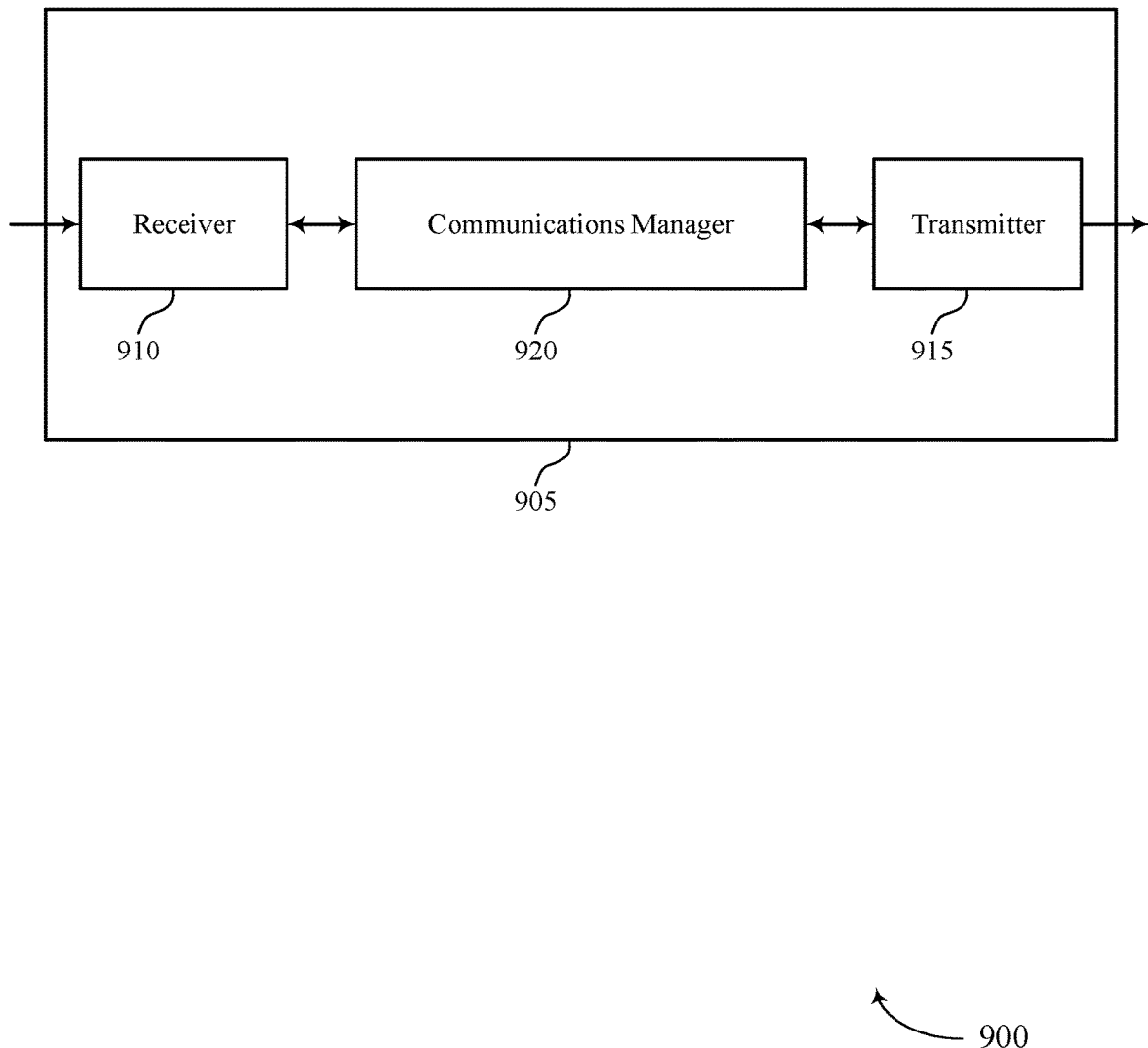
FIGS. 9 and 10 show block diagrams of devices that support gradual sensing for UE power saving in sidelink operation in accordance with aspects of the present disclosure.

FIG. 9 shows a block diagram 900 of a device 905 in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to gradual sensing for UE power saving in sidelink operation). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to gradual sensing for UE power saving in sidelink operation). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of gradual sensing for UE power saving in sidelink operation as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. For example, the communications manager 920 may be configured as or otherwise support a means for identifying a resource reservation configuration for communicating within a resource pool allocated for sidelink communications. The communications manager 920 may be configured as or otherwise support a means for transitioning from a first power state to a second power state that consumes more power than the first power state after a first sensing window occurs, the first sensing window corresponding to a first resource selection window of the resource pool of the resource reservation configuration. The communications manager 920 may be configured as or otherwise support a means for determining that a first subset of resources of the resource pool in the first resource selection window are available for sidelink data transmission based on the transitioning from the first power state to the second power state.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing and reduced power consumption. By operating in a low power mode until the device 905 has sidelink data to transmit, the processor may reduce power consumption. For example, the processor may refrain from performing channel sensing, may monitor a smaller bandwidth, may enter a sleep mode, or the like, during a low power state, which may result in fewer operations performed by the device 905 and correspond to reduced processing and power consumption by the processor. By identifying available resources corresponding to resources the device 905 did not monitor due to the low power state, the processor of the device 905 may refrain from processing (e.g., monitoring and performing channel measurements) on each resource in a resource pool.

Figure 10:
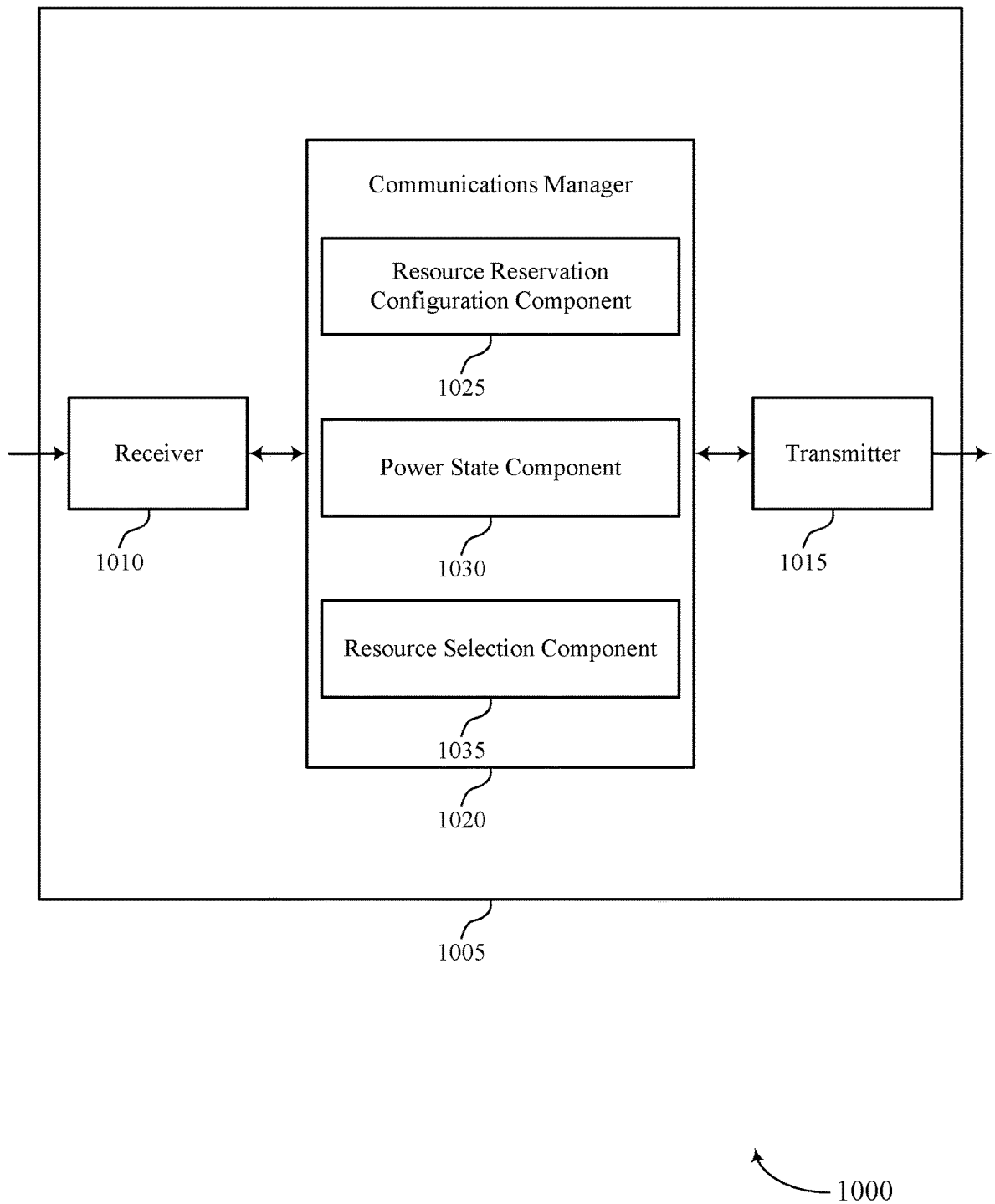

FIG. 10 shows a block diagram 1000 of a device 1005 that supports gradual sensing for UE power saving in sidelink operation in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to gradual sensing for UE power saving in sidelink operation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to gradual sensing for UE power saving in sidelink operation). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of gradual sensing for UE power saving in sidelink operation as described herein. For example, the communications manager 1020 may include a resource reservation configuration component 1025, a power state component 1030, a resource selection component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. The resource reservation configuration component 1025 may be configured as or otherwise support a means for identifying a resource reservation configuration for communicating within a resource pool allocated for sidelink communications. The power state component 1030 may be configured as or otherwise support a means for transitioning from a first power state to a second power state that consumes more power than the first power state after a first sensing window occurs, the first sensing window corresponding to a first resource selection window of the resource pool of the resource reservation configuration. The resource selection component 1035 may be configured as or otherwise support a means for determining that a first subset of resources of the resource pool in the first resource selection window are available for sidelink data transmission based on the transitioning from the first power state to the second power state.

Figure 11:
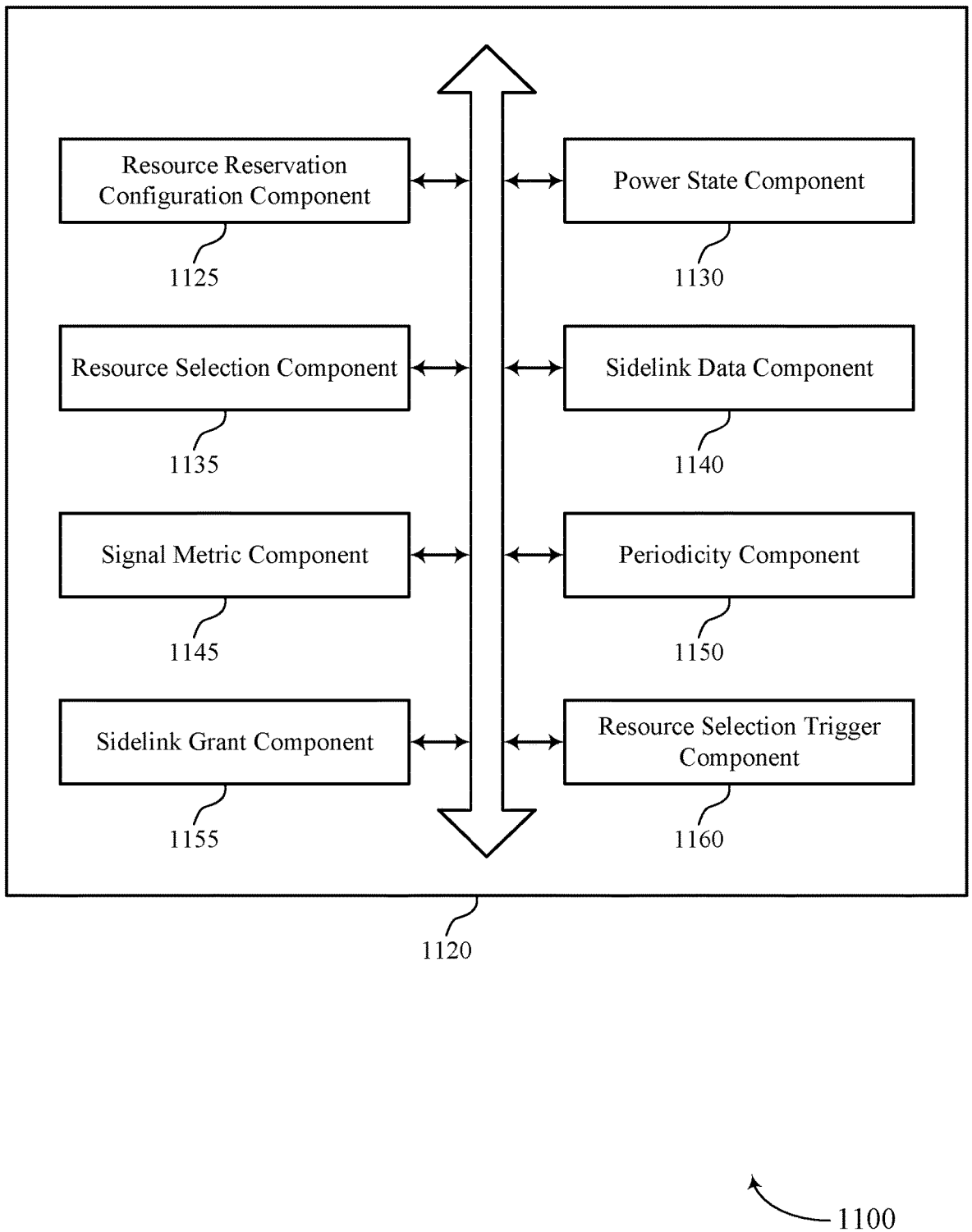
FIG. 11 shows a block diagram of a communications manager in accordance with aspects of the present disclosure.

FIG. 11 shows a block diagram 1100 of a communications manager 1120 in accordance with aspects of the present disclosure. The communications manager 1120 may be an example of aspects of a communications manager 920, a communications manager 1020, or both, as described herein. The communications manager 1120, or various components thereof, may be an example of means for performing various aspects of gradual sensing for UE power saving in sidelink operation as described herein. For example, the communications manager 1120 may include a resource reservation configuration component 1125, a power state component 1130, a resource selection component 1135, a sidelink data component 1140, a signal metric component 1145, a periodicity component 1150, a sidelink grant component 1155, a resource selection trigger component 1160, or any combination thereof. Each of these components may communicate, directly or indirectly, with one another (e.g., via one or more buses).

The communications manager 1120 may support wireless communication at a UE in accordance with examples as disclosed herein. The resource reservation configuration component 1125 may be configured as or otherwise support a means for identifying a resource reservation configuration for communicating within a resource pool allocated for sidelink communications. The power state component 1130 may be configured as or otherwise support a means for transitioning from a first power state to a second power state that consumes more power than the first power state after a first sensing window occurs, the first sensing window corresponding to a first resource selection window of the resource pool of the resource reservation configuration. The resource selection component 1135 may be configured as or otherwise support a means for determining that a first subset of resources of the resource pool in the first resource selection window are available for sidelink data transmission based on the transitioning from the first power state to the second power state.

In some examples, the resource selection component 1135 may be configured as or otherwise support a means for selecting a resource from the first subset of resources. In some examples, the sidelink data component 1140 may be configured as or otherwise support a means for transmitting a sidelink data message within the resource.

In some examples, the resource selection component 1135 may be configured as or otherwise support a means for determining that the first subset of resources of the first resource selection window are available for sidelink data transmission based on the UE operating in the first power state during a sensing resource in the first sensing window that corresponds to the first subset of resources.

In some examples, the sidelink data component 1140 may be configured as or otherwise support a means for transmitting a sidelink data message within a second subset of resources in a second sensing window corresponding to a second resource selection window of the resource pool. In some examples, the resource selection component 1135 may be configured as or otherwise support a means for determining that a third subset of resources in the second resource selection window corresponding to the second subset of resources are available for sidelink data transmission based on the transmitting.

In some examples, the sidelink data component 1140 may be configured as or otherwise support a means for transmitting a sidelink data message within a second subset of resources in a second sensing window corresponding to a second resource selection window of the resource pool. In some examples, the resource selection component 1135 may be configured as or otherwise support a means for determining that a resource of the second resource selection window is not available for sidelink transmission based on transmitting the sidelink data message within the second subset of resources in the second sensing window.

In some examples, to support determining that the first subset of resources of the first resource selection window are available, the signal metric component 1145 may be configured as or otherwise support a means for determining that the first subset of resources of the first resource selection window are available for data transmission based on the first subset of resources being assigned a defined signal metric level. In some examples, to support determining that the first subset of resources of the first resource selection window are available, the signal metric component 1145 may be configured as or otherwise support a means for comparing a signal metric value assigned for a priority level of a sidelink data message to be transmitted in the first resource selection window with the defined signal metric level. In some examples, to support determining that the first subset of resources of the first resource selection window are available, the resource selection component 1135 may be configured as or otherwise support a means for determining that the first subset of resources of the first resource selection window are available for sidelink data transmission based on the comparing.

In some examples, the first subset of resources are assigned the defined signal metric level based on the first subset of resources corresponding to a TTI within the first sensing window within which the UE operated in the first power state.

In some examples, the signal metric component 1145 may be configured as or otherwise support a means for identifying a second resource in the first resource selection window that is available for sidelink data transmission based on the second resource having a measured signal metric level that is lower than the defined signal metric level. In some examples, the sidelink data component 1140 may be configured as or otherwise support a means for transmitting a sidelink data message in the second resource in the first resource selection window based on identifying that the measured signal metric level is lower than the defined signal metric level. In some examples, the defined signal metric level is a reference signal receive power level.

In some examples, to support identifying the resource reservation configuration, the periodicity component 1150 may be configured as or otherwise support a means for identifying the resource reservation configuration that indicates a first resource reservation periodicity that is shorter than a second resource reservation periodicity. In some examples, to support identifying the resource reservation configuration, the periodicity component 1150 may be configured as or otherwise support a means for determining that the first subset of resources of the first resource selection window are available based on monitoring a slot in the first sensing window that corresponds to the first resource reservation periodicity.

In some examples, to support determining that the first subset of resources are available, the periodicity component 1150 may be configured as or otherwise support a means for determining that the first subset of resources of the first resource selection window are available based on an instance of the second resource reservation periodicity corresponding to the first sensing window occurring when the UE is operating in the first power state.

In some examples, the sidelink grant component 1155 may be configured as or otherwise support a means for transmitting, within the first subset of resources, a first sidelink control message that includes SCI that includes a grant scheduling a first sidelink data message within the resource pool. In some examples, the sidelink data component 1140 may be configured as or otherwise support a means for transmitting the first sidelink data message based on the grant.

In some examples, to support transitioning from the first power state to the second power state, the resource selection trigger component 1160 may be configured as or otherwise support a means for receiving a resource selection trigger. In some examples, to support transitioning from the first power state to the second power state, the power state component 1130 may be configured as or otherwise support a means for transitioning from the first power state to the second power state based on receiving the resource selection trigger.

In some examples, the first power state corresponds to a first BWP and the second power state corresponds to a second BWP that is wider than the first BWP. In some examples, the first power state corresponds to a sleep duration of a DRX cycle and the second power state corresponds to an on duration of the DRX cycle.

Figure 12:
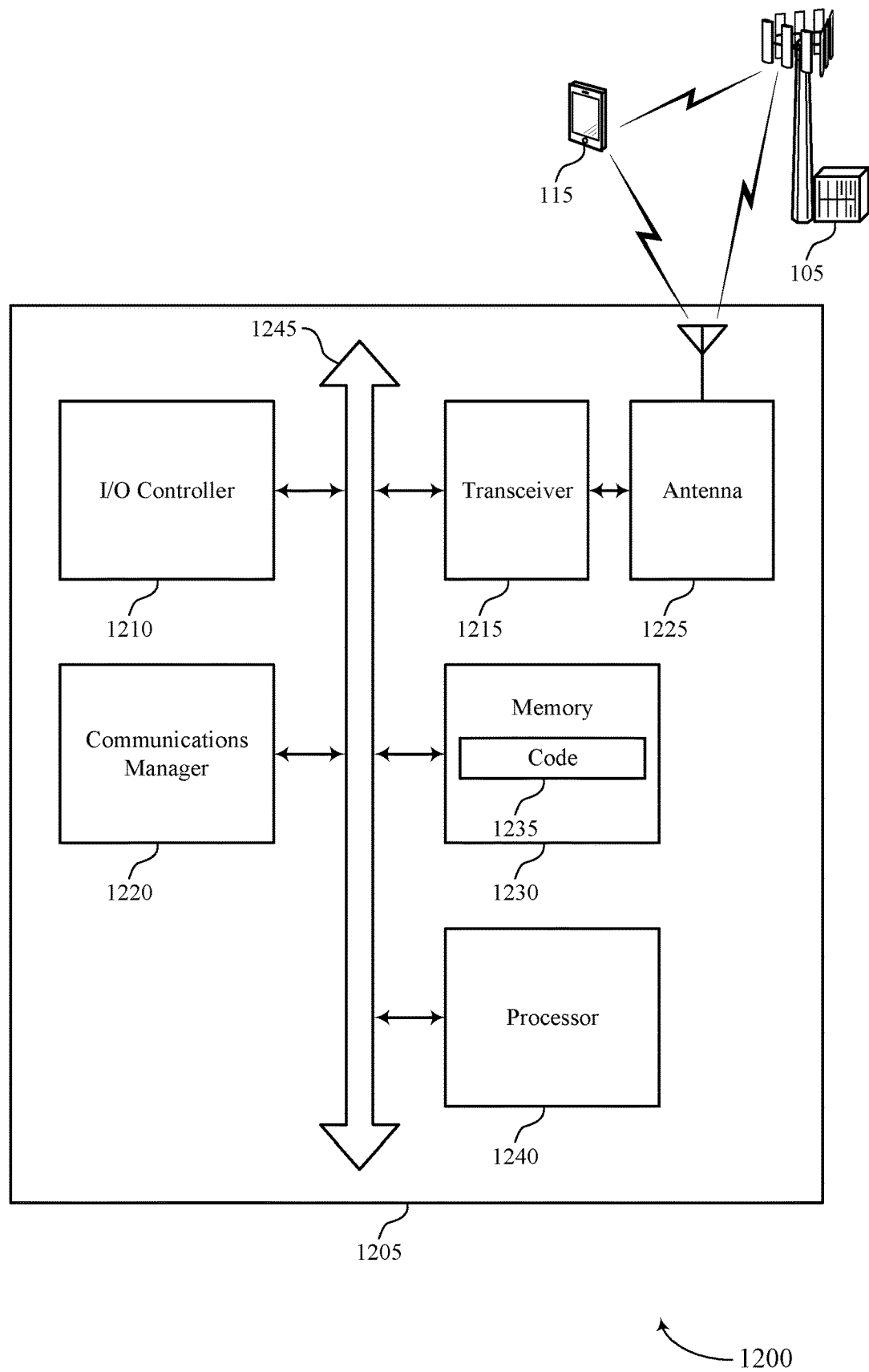
FIG. 12 shows a diagram of a system including a device in accordance with aspects of the present disclosure.

FIG. 12 shows a diagram of a system 1200 including a device 1205 in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting gradual sensing for UE power saving in sidelink operation). For example, the device 1205 or a component of the device 1205 may include a processor 1240 and memory 1230 coupled to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for identifying a resource reservation configuration for communicating within a resource pool allocated for sidelink communications. The communications manager 1220 may be configured as or otherwise support a means for transitioning from a first power state to a second power state that consumes more power than the first power state after a first sensing window occurs, the first sensing window corresponding to a first resource selection window of the resource pool of the resource reservation configuration. The communications manager 1220 may be configured as or otherwise support a means for determining that a first subset of resources of the resource pool in the first resource selection window are available for sidelink data transmission based on the transitioning from the first power state to the second power state.

By including or configuring the communications manager 1220 in accordance with examples as described herein, the device 1205 may support techniques for reduced latency, reduced power consumption, longer battery life, and improved utilization of processing capability. The device 1205 may operate in a power saving mode to reduce power consumption and improve the battery life of the device 1205. While operating in the power saving mode, the device 1205 may avoid increased latency that may be a result of operating in a low power state by determining that resources in a resource selection window that correspond to resources the device 1205 did not monitor in a corresponding sensing window are available for sidelink transmission. The device 1205 may thereby be configured with a resource reservation configuration that may permit some potential interference to better enable the sidelink device 1205 to transition between low power states and high power states to save power without incurring significant latency.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of gradual sensing for UE power saving in sidelink operation as described herein, or the processor 1240 and the memory 1230 may be otherwise configured to perform or support such operations.

Figure 13:
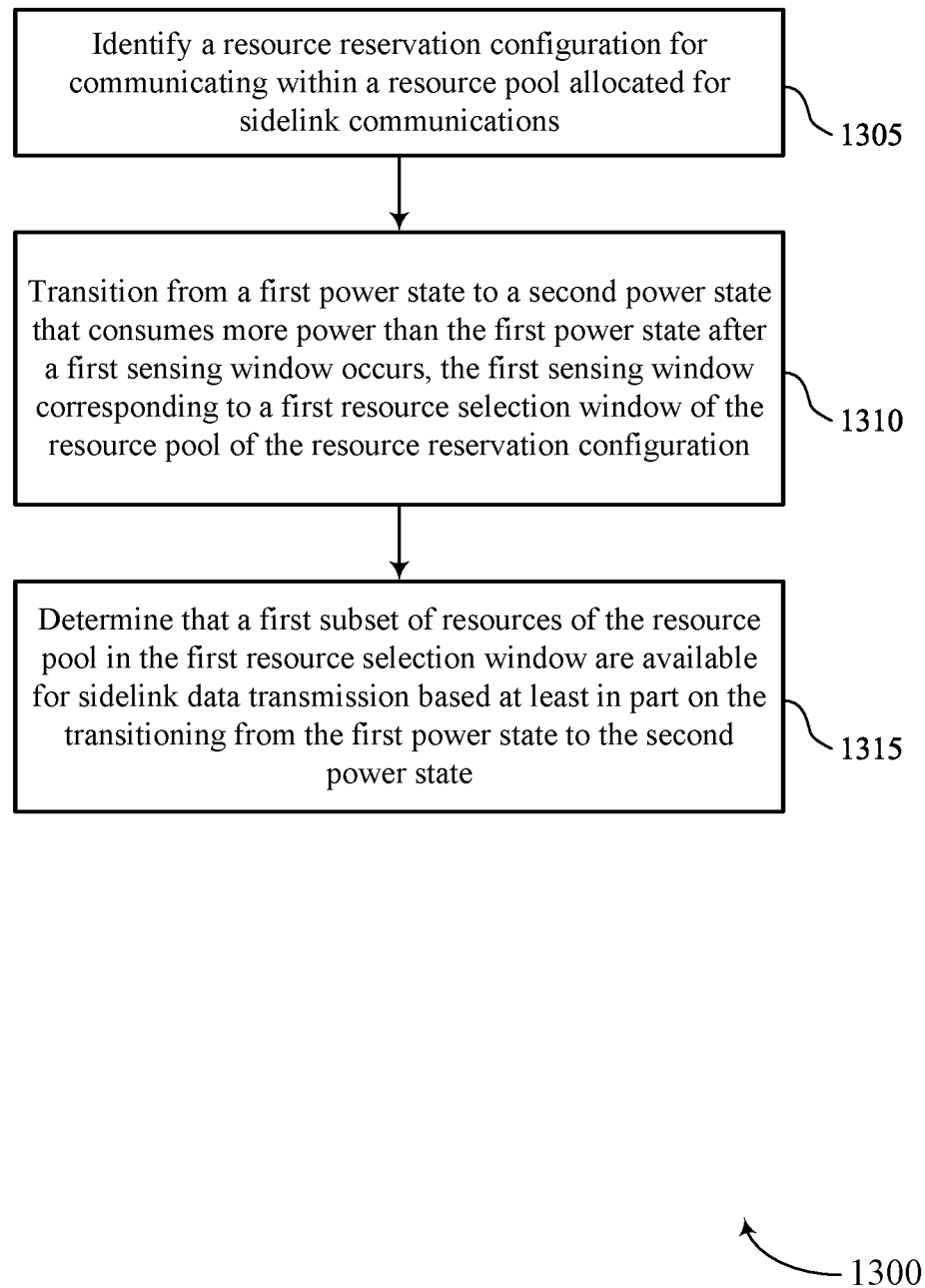
FIGS. 13 through 16 show flowcharts illustrating methods in accordance with aspects of the present disclosure.

FIG. 13 shows a flowchart illustrating a method 1300 in accordance with aspects of the present disclosure. The operations of the method 1300 may be implemented by a UE or its components as described herein. For example, the operations of the method 1300 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1305, the method may include identifying a resource reservation configuration for communicating within a resource pool allocated for sidelink communications. The operations of 1305 may be performed in accordance with examples as disclosed herein. In some examples, aspects of the operations of 1305 may be performed by a resource reservation configuration component 1125 as described with reference to FIG. 11.

At 1310, the method may include transitioning from a first power state to a second power state that consumes more power than the first power state after a first sensing window occurs, the first sensing window corresponding to a first resource selection window of the resource pool of the resource reservation configuration. The operations of 1310 may be performed in accordance with examples as disclosed herein. In some examples, aspects of the operations of 1310 may be performed by a power state component 1130 as described with reference to FIG. 11.

At 1315, the method may include determining that a first subset of resources of the resource pool in the first resource selection window are available for sidelink data transmission based on the transitioning from the first power state to the second power state. The operations of 1315 may be performed in accordance with examples as disclosed herein. In some examples, aspects of the operations of 1315 may be performed by a resource selection component 1135 as described with reference to FIG. 11.

Figure 14:
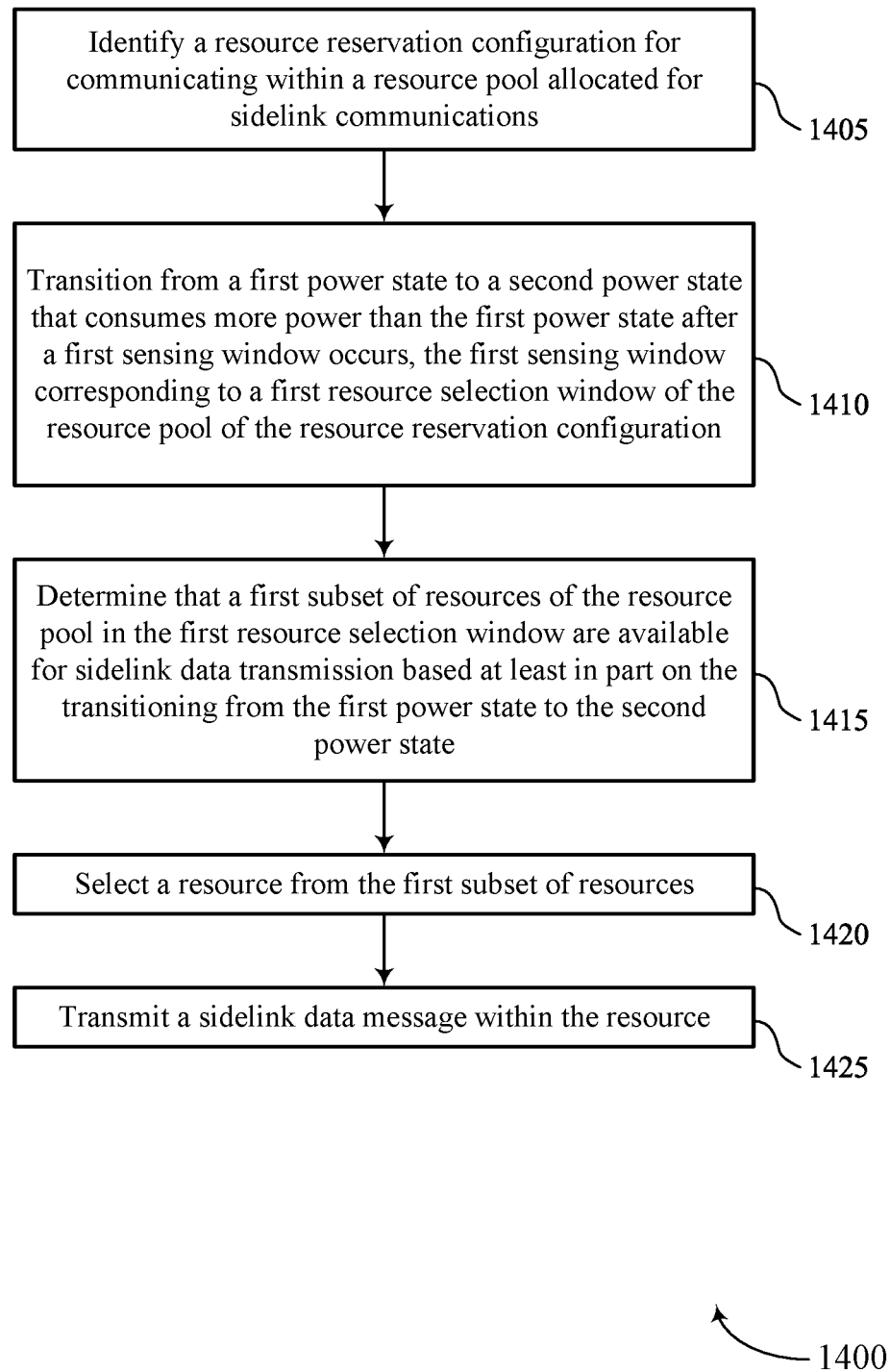

FIG. 14 shows a flowchart illustrating a method 1400 in accordance with aspects of the present disclosure. The operations of the method 1400 may be implemented by a UE or its components as described herein. For example, the operations of the method 1400 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1405, the method may include identifying a resource reservation configuration for communicating within a resource pool allocated for sidelink communications. The operations of 1405 may be performed in accordance with examples as disclosed herein. In some examples, aspects of the operations of 1405 may be performed by a resource reservation configuration component 1125 as described with reference to FIG. 11.

At 1410, the method may include transitioning from a first power state to a second power state that consumes more power than the first power state after a first sensing window occurs, the first sensing window corresponding to a first resource selection window of the resource pool of the resource reservation configuration. The operations of 1410 may be performed in accordance with examples as disclosed herein. In some examples, aspects of the operations of 1410 may be performed by a power state component 1130 as described with reference to FIG. 11.

At 1415, the method may include determining that a first subset of resources of the resource pool in the first resource selection window are available for sidelink data transmission based on the transitioning from the first power state to the second power state. The operations of 1415 may be performed in accordance with examples as disclosed herein. In some examples, aspects of the operations of 1415 may be performed by a resource selection component 1135 as described with reference to FIG. 11.

At 1420, the method may include selecting a resource from the first subset of resources. The operations of 1420 may be performed in accordance with examples as disclosed herein. In some examples, aspects of the operations of 1420 may be performed by a resource selection component 1135 as described with reference to FIG. 11.

At 1425, the method may include transmitting a sidelink data message within the resource. The operations of 1425 may be performed in accordance with examples as disclosed herein. In some examples, aspects of the operations of 1425 may be performed by a sidelink data component 1140 as described with reference to FIG. 11.

Figure 15:
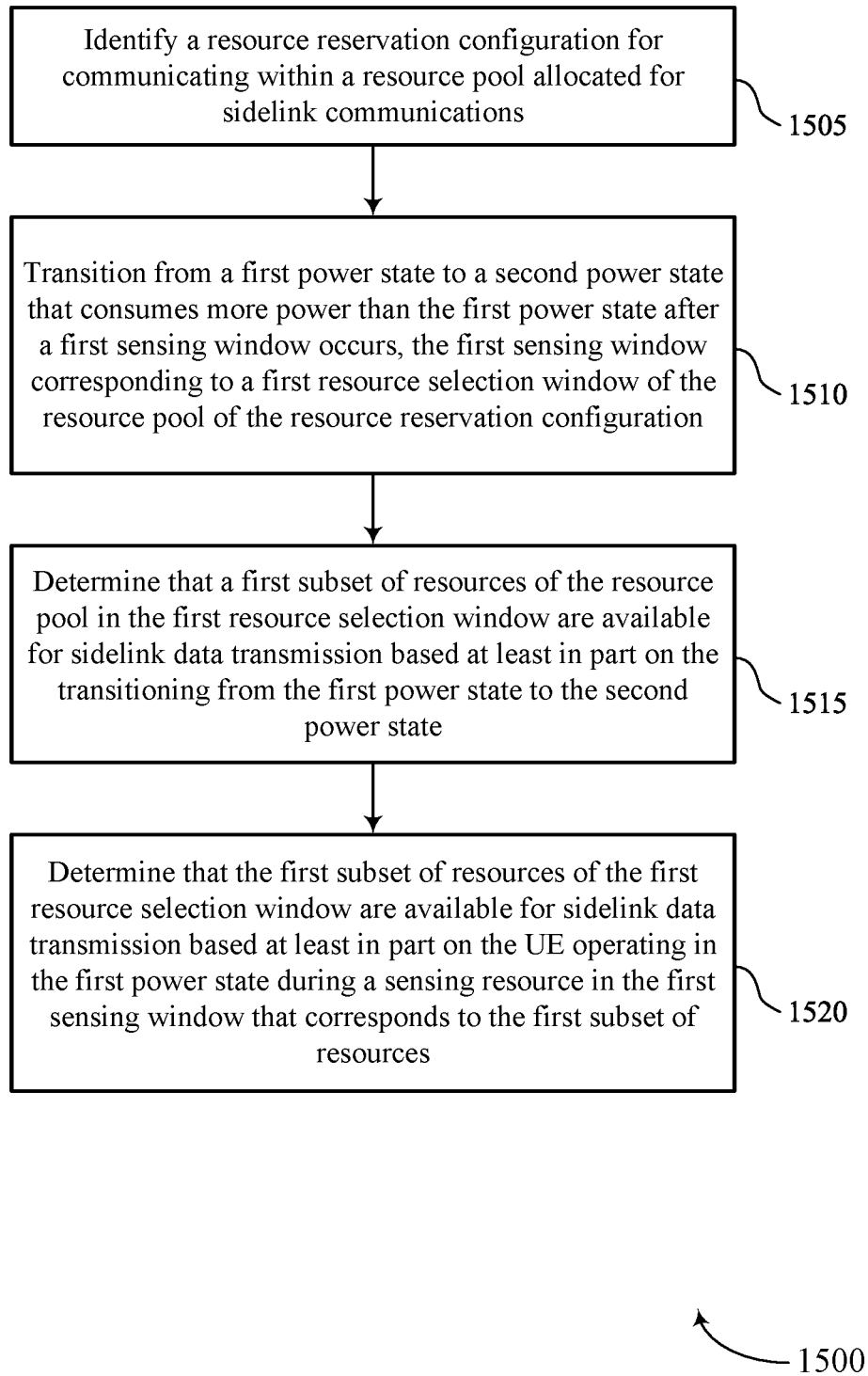

FIG. 15 shows a flowchart illustrating a method 1500 in accordance with aspects of the present disclosure. The operations of the method 1500 may be implemented by a UE or its components as described herein. For example, the operations of the method 1500 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1505, the method may include identifying a resource reservation configuration for communicating within a resource pool allocated for sidelink communications. The operations of 1505 may be performed in accordance with examples as disclosed herein. In some examples, aspects of the operations of 1505 may be performed by a resource reservation configuration component 1125 as described with reference to FIG. 11.

At 1510, the method may include transitioning from a first power state to a second power state that consumes more power than the first power state after a first sensing window occurs, the first sensing window corresponding to a first resource selection window of the resource pool of the resource reservation configuration. The operations of 1510 may be performed in accordance with examples as disclosed herein. In some examples, aspects of the operations of 1510 may be performed by a power state component 1130 as described with reference to FIG. 11.

At 1515, the method may include determining that a first subset of resources of the resource pool in the first resource selection window are available for sidelink data transmission based on the transitioning from the first power state to the second power state. The operations of 1515 may be performed in accordance with examples as disclosed herein. In some examples, aspects of the operations of 1515 may be performed by a resource selection component 1135 as described with reference to FIG. 11.

At 1520, the method may include determining that the first subset of resources of the first resource selection window are available for sidelink data transmission based on the UE operating in the first power state during a sensing resource in the first sensing window that corresponds to the first subset of resources. The operations of 1520 may be performed in accordance with examples as disclosed herein. In some examples, aspects of the operations of 1520 may be performed by a resource selection component 1135 as described with reference to FIG. 11.

Figure 16:
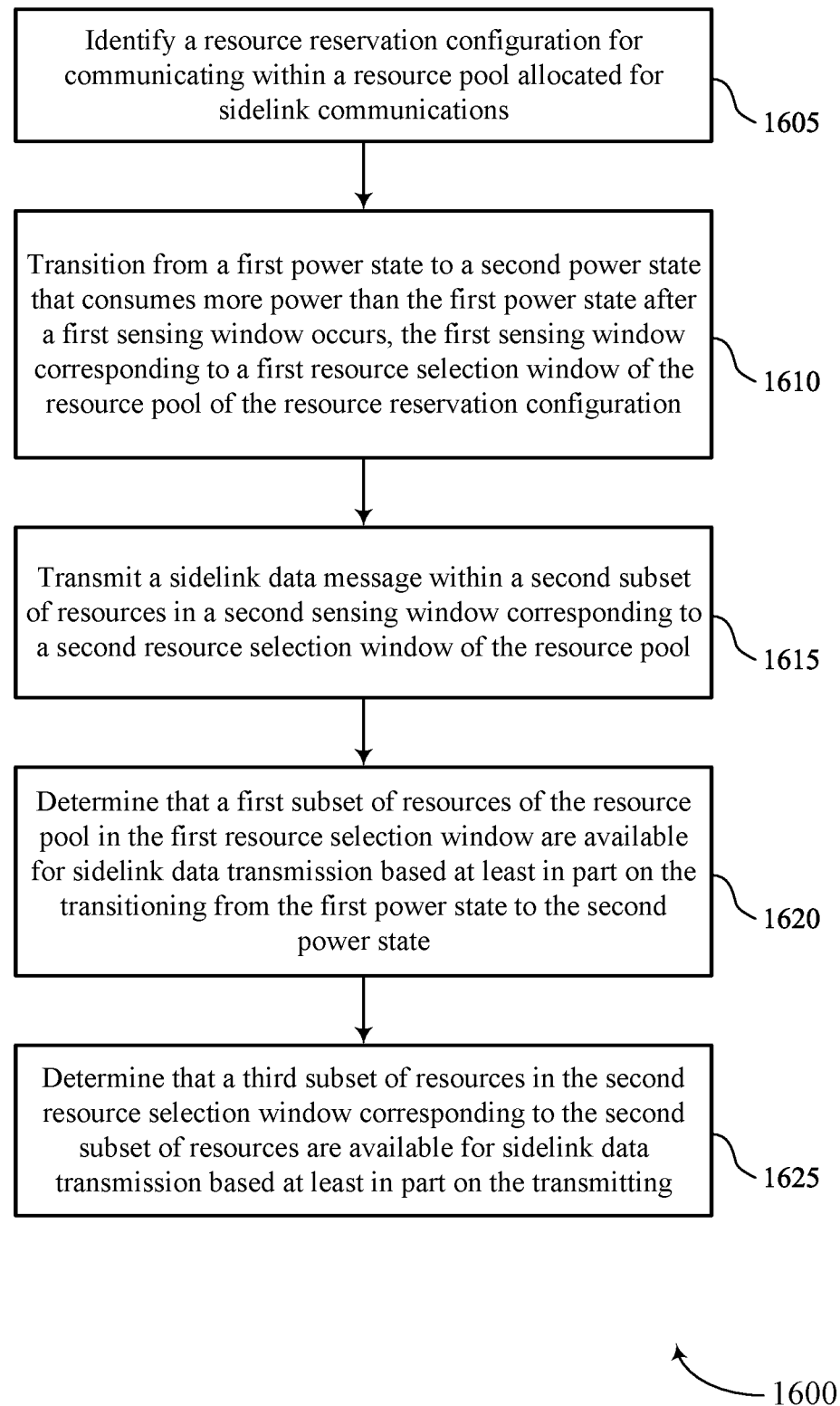

FIG. 16 shows a flowchart illustrating a method 1600 in accordance with aspects of the present disclosure. The operations of the method 1600 may be implemented by a UE or its components as described herein. For example, the operations of the method 1600 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1605, the method may include identifying a resource reservation configuration for communicating within a resource pool allocated for sidelink communications. The operations of 1605 may be performed in accordance with examples as disclosed herein. In some examples, aspects of the operations of 1605 may be performed by a resource reservation configuration component 1125 as described with reference to FIG. 11.

At 1610, the method may include transitioning from a first power state to a second power state that consumes more power than the first power state after a first sensing window occurs, the first sensing window corresponding to a first resource selection window of the resource pool of the resource reservation configuration. The operations of 1610 may be performed in accordance with examples as disclosed herein. In some examples, aspects of the operations of 1610 may be performed by a power state component 1130 as described with reference to FIG. 11.

At 1615, the method may include transmitting a sidelink data message within a second subset of resources in a second sensing window corresponding to a second resource selection window of the resource pool. The operations of 1615 may be performed in accordance with examples as disclosed herein. In some examples, aspects of the operations of 1615 may be performed by a sidelink data component 1140 as described with reference to FIG. 11.

At 1620, the method may include determining that a first subset of resources of the resource pool in the first resource selection window are available for sidelink data transmission based on the transitioning from the first power state to the second power state. The operations of 1620 may be performed in accordance with examples as disclosed herein. In some examples, aspects of the operations of 1620 may be performed by a resource selection component 1135 as described with reference to FIG. 11.

At 1625, the method may include determining that a third subset of resources in the second resource selection window corresponding to the second subset of resources are available for sidelink data transmission based on the transmitting. The operations of 1625 may be performed in accordance with examples as disclosed herein. In some examples, aspects of the operations of 1625 may be performed by a resource selection component 1135 as described with reference to FIG. 11.

Summary of Aspects

The following provides an overview of aspects of the present disclosure:

Aspect 1: A method for wireless communication at a UE, comprising: identifying a resource reservation configuration for communicating within a resource pool allocated for sidelink communications; transitioning from a first power state to a second power state that consumes more power than the first power state after a first sensing window occurs, the first sensing window corresponding to a first resource selection window of the resource pool of the resource reservation configuration; and determining that a first subset of resources of the resource pool in the first resource selection window are available for sidelink data transmission based at least in part on the transitioning from the first power state to the second power state.

Aspect 2: The method of aspect 1, further comprising: selecting a resource from the first subset of resources; and transmitting a sidelink data message within the resource.

Aspect 3: The method of any of aspects 1 through 2, further comprising: determining that the first subset of resources of the first resource selection window are available for sidelink data transmission based at least in part on the UE operating in the first power state during a sensing resource in the first sensing window that corresponds to the first subset of resources.

Aspect 4: The method of any of aspects 1 through 3, further comprising: transmitting a sidelink data message within a second subset of resources in a second sensing window corresponding to a second resource selection window of the resource pool; and determining that a third subset of resources in the second resource selection window corresponding to the second subset of resources are available for sidelink data transmission based at least in part on the transmitting.

Aspect 5: The method of any of aspects 1 through 3, further comprising: transmitting a sidelink data message within a second subset of resources in a second sensing window corresponding to a second resource selection window of the resource pool; and determining that a resource of the second resource selection window is not available for sidelink transmission based at least in part on transmitting the sidelink data message within the second subset of resources in the second sensing window.

Aspect 6: The method of any of aspects 1 through 3, wherein determining that the first subset of resources of the first resource selection window are available comprises: determining that the first subset of resources of the first resource selection window are available for data transmission based at least in part on the first subset of resources being assigned a defined signal metric level.

Aspect 7: The method of aspect 6, wherein determining that the first subset of resources of the first resource selection window are available comprises: comparing a signal metric value assigned for a priority level of a sidelink data message to be transmitted in the first resource selection window with the defined signal metric level; and determining that the first subset of resources of the first resource selection window are available for sidelink data transmission based at least in part on the comparing.

Aspect 8: The method of any of aspects 6 through 7, wherein the first subset of resources are assigned the defined signal metric level based at least in part on the first subset of resources corresponding to a TTI within the first sensing window within which the UE operated in the first power state.

Aspect 9: The method of any of aspects 6 through 8, further comprising: identifying a second resource in the first resource selection window that is available for sidelink data transmission based at least in part on the second resource having a measured signal metric level that is lower than the defined signal metric level.

Aspect 10: The method of aspect 9, further comprising: transmitting a sidelink data message in the second resource in the first resource selection window based at least in part on identifying that the measured signal metric level is lower than the defined signal metric level.

Aspect 11: The method of any of aspects 6 through 10, wherein the defined signal metric level is a reference signal receive power level.

Aspect 12: The method of any of aspects 1 through 3, wherein identifying the resource reservation configuration further comprises: identifying the resource reservation configuration that indicates a first resource reservation periodicity that is shorter than a second resource reservation periodicity; determining that the first subset of resources of the first resource selection window are available based at least in part on monitoring a slot in the first sensing window that corresponds to the first resource reservation periodicity.

Aspect 13: The method of aspect 12, wherein determining that the first subset of resources are available comprises: determining that the first subset of resources of the first resource selection window are available based at least in part on an instance of the second resource reservation periodicity corresponding to the first sensing window occurring when the UE is operating in the first power state.

Aspect 14: The method of any of aspects 1 through 13, further comprising: transmitting, within the first subset of resources, a first sidelink control message that comprises sidelink control information that includes a grant scheduling a first sidelink data message within the resource pool; and transmitting the first sidelink data message based at least in part on the grant.

Aspect 15: The method of any of aspects 1 through 14, wherein the transitioning from the first power state to the second power state comprises: receiving a resource selection trigger; and transitioning from the first power state to the second power state based at least in part on receiving the resource selection trigger.

Aspect 16: The method of any of aspects 1 through 15, wherein the first power state corresponds to a first bandwidth part and the second power state corresponds to a second bandwidth part that is wider than the first bandwidth part.

Aspect 17: The method of any of aspects 1 through 16, wherein the first power state corresponds to a sleep duration of a DRX cycle and the second power state corresponds to an on duration of the DRX cycle.

Aspect 18: An apparatus for wireless communication at a UE, comprising a processor; memory coupled with the processor; and instructions stored in the memory and executable by the processor to cause the apparatus to perform a method of any of aspects 1 through 17.

Aspect 19: An apparatus for wireless communication at a UE, comprising at least one means for performing a method of any of aspects 1 through 17.

Aspect 20: A non-transitory computer-readable medium storing code for wireless communication at a UE, the code comprising instructions executable by a processor to perform a method of any of aspects 1 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    receiving control signaling indicating a resource reservation configuration, the resource reservation configuration indicating a first resource reservation periodicity and a second resource reservation periodicity that is different from the first resource reservation periodicity;
    monitoring a slot in a first sensing window that corresponds to a first resource reservation periodicity to determine whether a first subset of resources of a first resource selection window are available, the first resource selection window for selecting one or more resources of a resource pool in accordance with the resource reservation configuration, wherein monitoring of one or more slots in a second sensing window that corresponds to the second resource reservation periodicity is skipped;
    selecting, in the first resource selection window, a resource from the first subset of resources that is available for sidelink data transmission; and
    transmitting a sidelink data message within the resource.

2. The method of claim 1, wherein the selecting is in accordance with the resource reservation configuration permitting the UE to select resources of the resource pool that the UE did not monitor in the second sensing window.

3. The method of claim 1, further comprising operating in a first power state during a sensing resource in the first sensing window that corresponds to the first subset of resources, the first subset of resources of the first resource selection window being available for the sidelink data transmission associated at least in part with the UE operating in the first power state during the sensing resource in the first sensing window that corresponds to the first subset of resources, the first power state consuming less power than a second power state.

4. The method of claim 1, further comprising transmitting a second sidelink data message within a second subset of resources in a third sensing window corresponding to a second resource selection window of the resource pool, a third subset of resources in the second resource selection window corresponding to the second subset of resources being available for the sidelink data transmission associated at least in part with the transmitting the second sidelink data message.

5. The method of claim 1, further comprising transmitting a second sidelink data message within a second subset of resources in a third sensing window corresponding to a second resource selection window of the resource pool, a resource of the second resource selection window being unavailable for sidelink transmission associated at least in part with transmitting the second sidelink data message within the second subset of resources in the third sensing window.

6. The method of claim 1, wherein the first subset of resources of the first resource selection window are available for data transmission associated at least in part with the first subset of resources being assigned a defined signal metric level.

7. The method of claim 6, further comprising comparing a signal metric value assigned for a priority level of the sidelink data message to be transmitted in the first resource selection window with the defined signal metric level to determine whether the first subset of resources of the first resource selection window are available for the sidelink data transmission.

8. The method of claim 6, wherein the first subset of resources are assigned the defined signal metric level associated at least in part with the first subset of resources corresponding to a transmission time interval (TTI) within the first sensing window within which the UE operated in a first power state that consumes less power than a second power state.

9. The method of claim 6, further comprising selecting a second resource in the first resource selection window that is available for the sidelink data transmission associated at least in part with the second resource having a measured signal metric level that is lower than the defined signal metric level.

10. The method of claim 9, further comprising transmitting a second sidelink data message in the second resource in the first resource selection window associated at least in part with the measured signal metric level being lower than the defined signal metric level.

11. The method of claim 6, wherein the defined signal metric level is a reference signal receive power level.

12. The method of claim 1, wherein the first sensing window and the second sensing window correspond to the first resource selection window for the resource from the first subset of resources.

13. The method of claim 1, wherein the first subset of resources of the first resource selection window are available associated at least in part with an instance of the second resource reservation periodicity corresponding to the second sensing window occurring when the UE is operating in a first power state that consumes less power than a second power state.

14. The method of claim 1, further comprising:
transmitting, within the first subset of resources, a first sidelink control message that comprises sidelink control information that includes a grant scheduling a first sidelink data message within the resource pool; and
transmitting the first sidelink data message associated at least in part with the grant.

15. The method of claim 1, further comprising:
receiving a resource selection trigger; and
transitioning from a first power state to a second power state that consumes more power than the first power state after the first sensing window occurs, the transitioning associated at least in part with receiving the resource selection trigger.

16. The method of claim 1, wherein a first power state corresponds to a first bandwidth part and a second power state that consumes more power than the first power state corresponds to a second bandwidth part that is wider than the first bandwidth part.

17. The method of claim 1, wherein a first power state corresponds to a sleep duration of a discontinuous reception cycle and a second power state that consumes more power than the first power state corresponds to an on duration of the discontinuous reception cycle.

18. An apparatus for wireless communication at a user equipment (UE), comprising:
one or more processors;
memory coupled with the one or more processors; and
instructions stored in the memory and executable by the one or more processors to cause the apparatus to:
receive control signaling indicating a resource reservation configuration, the resource reservation configuration indicating a first resource reservation periodicity and a second resource reservation periodicity that is different from the first resource reservation periodicity;
monitor a slot in a first sensing window that corresponds to a first resource reservation periodicity to determine whether a first subset of resources of a first resource selection window are available, the first resource selection window for selecting one or more resources of a resource pool in accordance with the resource reservation configuration, the instructions stored in the memory and executable by the one or more processors to cause the apparatus to skip monitoring of one or more slots in a second sensing window that corresponds to the second resource reservation periodicity;
select, in the first resource selection window, a resource from the first subset of resources that is available for sidelink data transmission; and
transmit a sidelink data message within the resource.

19. The apparatus of claim 18, wherein the resource is selected in accordance with the resource reservation configuration permitting the UE to select resources of the resource pool that the UE did not monitor in the second sensing window.

20. The apparatus of claim 18, wherein the instructions are further executable by the one or more processors to cause the apparatus to operate in a first power state during a sensing resource in the first sensing window that corresponds to the first subset of resources, the first subset of resources of the first resource selection window being available for the sidelink data transmission associated at least in part with the UE operating in the first power state during the sensing resource in the first sensing window that corresponds to the first subset of resources, the first power state consuming less power than a second power state.

21. The apparatus of claim 18, further comprising a transceiver, wherein the instructions are further executable by the one or more processors to cause the apparatus to transmit, via the transceiver, a second sidelink data message within a second subset of resources in a third sensing window corresponding to a second resource selection window of the resource pool, a third subset of resources in the second resource selection window corresponding to the second subset of resources being available for the sidelink data transmission associated at least in part with the second sidelink data message.

22. The apparatus of claim 18, wherein the instructions are further executable by the one or more processors to cause the apparatus to transmit a second sidelink data message within a second subset of resources in a third sensing window corresponding to a second resource selection window of the resource pool, a resource of the second resource selection window being unavailable for sidelink transmission associated at least in part with transmitting the second sidelink data message within the second subset of resources in the third sensing window.

23. An apparatus for wireless communication at a user equipment (UE), comprising:
means for receiving control signaling indicating a resource reservation configuration, the resource reservation configuration indicating a first resource reservation periodicity and a second resource reservation periodicity that is different from the first resource reservation periodicity;
means for monitoring a slot in a first sensing window that corresponds to a first resource reservation periodicity to determine whether a first subset of resources of a first resource selection window are available, the first resource selection window for selecting one or more resources of a resource pool in accordance with the resource reservation configuration, wherein the means for monitoring skips monitoring of one or more slots in a second sensing window that corresponds to the second resource reservation periodicity;
means for selecting, in the first resource selection window, a resource from the first subset of resources that is available for sidelink data transmission; and
means for transmitting a sidelink data message within the resource.

24. The apparatus of claim 23, wherein the means for selecting is in accordance with the resource reservation configuration permitting the UE to select resources of the resource pool that the UE did not monitor in the second sensing window.

25. The apparatus of claim 23, further comprising means for operating in a first power state during a sensing resource in the first sensing window that corresponds to the first subset of resources, the first subset of resources of the first resource selection window being available for the sidelink data transmission associated at least in part with the UE operating in the first power state during the sensing resource in the first sensing window that corresponds to the first subset of resources, the first power state consuming less power than a second power state.

26. The apparatus of claim 23, further comprising means for transmitting a second sidelink data message within a second subset of resources in a third sensing window corresponding to a second resource selection window of the resource pool, a third subset of resources in the second resource selection window corresponding to the second subset of resources being available for the sidelink data transmission associated at least in part with the second sidelink data message.

27. The apparatus of claim 23, further comprising means for transmitting a second sidelink data message within a second subset of resources in a third sensing window corresponding to a second resource selection window of the resource pool, a resource of the second resource selection window being unavailable for sidelink transmission associated at least in part with transmitting the second sidelink data message within the second subset of resources in the third sensing window.

28. A non-transitory computer-readable medium storing code for wireless communication at a user equipment (UE), the code comprising instructions executable by a processor to:

receive control signaling indicating a resource reservation configuration, the resource reservation configuration indicating a first resource reservation periodicity and a second resource reservation periodicity that is different from the first resource reservation periodicity;

monitor a slot in a first sensing window that corresponds to a first resource reservation periodicity to determine whether a first subset of resources of a first resource selection window are available, the first resource selection window for selecting one or more resources of a resource pool in accordance with the resource reservation configuration, wherein the code comprises instructions executable by the processor to skip monitoring of one or more slots in a second sensing window that corresponds to the second resource reservation periodicity;

select, in the first resource selection window, a resource from the first subset of resources that is available for sidelink data transmission; and transmit a sidelink data message within the resource.

29. The non-transitory computer-readable medium of claim 28, wherein the resource is selected in accordance with the resource reservation configuration permitting the UE to select resources of the resource pool that the UE did not monitor in the second sensing window.

30. The non-transitory computer-readable medium of claim 28, wherein the instructions are further executable by the processor to operate in a first power state during a sensing resource in the first sensing window that corresponds to the first subset of resources, the first subset of resources of the first resource selection window are available for the sidelink data transmission associated at least in part with the UE operating in the first power state during the sensing resource in the first sensing window that corresponds to the first subset of resources, the first power state consuming less power than a second power state.

* * * * *